(12) United States Patent
Ghassabian

(10) Patent No.: US 8,498,406 B2
(45) Date of Patent: *Jul. 30, 2013

(54) INTEGRATED KEYPAD SYSTEM

(75) Inventor: Firooz Benjamin Ghassabian, Great Neck, NY (US)

(73) Assignee: Keyless Systems Ltd., Jerusalem (IL)

( * ) Notice: Subject to any disclaimer, the term of this patent is extended or adjusted under 35 U.S.C. 154(b) by 208 days.

This patent is subject to a terminal disclaimer.

(21) Appl. No.: 12/246,080

(22) Filed: Oct. 6, 2008

(65) Prior Publication Data

US 2009/0037623 A1 Feb. 5, 2009

Related U.S. Application Data

(63) Continuation of application No. 11/157,203, filed on Jun. 20, 2005, now abandoned, which is a continuation of application No. 10/111,888, filed as application No. PCT/US00/29647 on Oct. 27, 2000, now Pat. No. 7,020,270.

(60) Provisional application No. 60/163,996, filed on Oct. 27, 1999, provisional application No. 60/164,656, filed on Nov. 4, 1999, provisional application No. 60/164,597, filed on Nov. 10, 1999, provisional application No. 60/169,149, filed on Dec. 6, 1999, provisional application No. 60/194,767, filed on Apr. 3, 2000, provisional application No. 60/208,619, filed on Jun. 1, 2000, provisional application No. 60/220,578, filed on Jul. 25, 2000.

(51) Int. Cl.
*H04M 1/00* (2006.01)
*H04M 9/00* (2006.01)

(52) U.S. Cl.
USPC .......................................................... 379/368

(58) Field of Classification Search
USPC .......................................................... 379/368
See application file for complete search history.

(56) References Cited

U.S. PATENT DOCUMENTS

| 4,531,119 | A | 7/1985 | Nakayama et al. |
| 4,769,845 | A | 9/1988 | Nakamura |

(Continued)

FOREIGN PATENT DOCUMENTS

| CN | 1131764 | 9/1996 |
| CN | 1153353 | 7/1997 |

(Continued)

OTHER PUBLICATIONS

CN 1015859B—English language Abstract.

(Continued)

*Primary Examiner* — Alexander Jamal
(74) *Attorney, Agent, or Firm* — Dekel Patent Ltd.; David Klein

(57) ABSTRACT

A data entry system using a number of different input signals provided by interacting with input means such as keys wherein to at least some of the different input signals a number of symbols including substantially all of the letters of the alphabet of one language are distributively assigned such that at least two of the letters are ambiguously assigned to at least one of the some input signals. The data entry system includes a database of words and uses a word predictive system such that in order to enter a word of the database the user provides a first input information consisting of providing the input signals corresponding to the characters, generally the letters, of the word, and an additional input information corresponding to at least one of the characters of the word and its corresponding input signal provided through the first input information, and wherein the system precisely recognizes the character among the ambiguous characters assigned to the input signal and provides a word of the dictionary that corresponds to the first and the additional input information.

24 Claims, 34 Drawing Sheets

U.S. PATENT DOCUMENTS

| | | | |
|---|---|---|---|
| 5,017,030 A | 5/1991 | Crews | |
| 5,305,205 A | 4/1994 | Weber et al. | |
| 5,311,175 A | 5/1994 | Waldman | |
| 5,467,324 A | 11/1995 | Houlihan | |
| 5,473,726 A | 12/1995 | Marshall | |
| 5,659,611 A | 8/1997 | Saksa | |
| 5,675,687 A | 10/1997 | Wood | |
| 5,689,547 A | 11/1997 | Molne | |
| 5,767,842 A | 6/1998 | Korth | |
| 5,790,103 A | 8/1998 | Willner | |
| 5,797,089 A | 8/1998 | Nguyen | |
| 5,818,437 A | 10/1998 | Grover et al. | |
| 5,867,149 A | 2/1999 | Jaeger | |
| 5,901,222 A | 5/1999 | Macor | |
| 5,936,556 A | 8/1999 | Sakita | |
| 5,943,625 A | 8/1999 | Yeom et al. | |
| 5,953,541 A * | 9/1999 | King et al. | 710/67 |
| 5,982,302 A | 11/1999 | Ure | |
| 6,003,072 A | 12/1999 | Gerritsen et al. | |
| 6,011,554 A | 1/2000 | King et al. | |
| 6,029,068 A | 2/2000 | Takahashi et al. | |
| 6,043,761 A | 3/2000 | Burrell | |
| 6,073,033 A | 6/2000 | Campo | |
| 6,128,514 A | 10/2000 | Griffith et al. | |
| 6,144,358 A | 11/2000 | Narayanaswamy et al. | |
| 6,216,017 B1 | 4/2001 | Lee et al. | |
| 6,223,059 B1 | 4/2001 | Haestrup | |
| 6,226,501 B1 | 5/2001 | Weadon et al. | |
| 6,246,570 B1 | 6/2001 | Kim | |
| 6,259,771 B1 | 7/2001 | Kredo et al. | |
| 6,278,384 B1 | 8/2001 | Ide | |
| 6,286,064 B1 | 9/2001 | King et al. | |
| 6,295,052 B1 | 9/2001 | Kato et al. | |
| 6,326,952 B1 | 12/2001 | Amro et al. | |
| 6,337,914 B1 | 1/2002 | Phillipps | |
| 6,346,894 B1 * | 2/2002 | Connolly et al. | 341/22 |
| 6,356,258 B1 | 3/2002 | Kato et al. | |
| 6,356,866 B1 | 3/2002 | Pratley et al. | |
| 6,359,572 B1 | 3/2002 | Vale | |
| 6,385,582 B1 | 5/2002 | Iwata | |
| 6,392,640 B1 | 5/2002 | Will | |
| 6,445,381 B1 | 9/2002 | Chou | |
| 6,542,090 B1 | 4/2003 | Tadano et al. | |
| 6,560,320 B1 | 5/2003 | Paleiov et al. | |
| 6,587,818 B2 | 7/2003 | Kanevsky et al. | |
| 6,734,881 B1 | 5/2004 | Will | |
| 6,868,140 B2 | 3/2005 | Myers et al. | |
| 6,885,317 B1 | 4/2005 | Gutowitz | |
| 6,894,679 B2 | 5/2005 | Suzuki | |
| 6,925,154 B2 | 8/2005 | Gao et al. | |
| 6,927,908 B2 | 8/2005 | Stark | |
| 7,020,270 B1 | 3/2006 | Ghassabian | |
| 7,027,990 B2 | 4/2006 | Sussman | |
| 7,055,219 B2 | 6/2006 | Shiba | |
| 7,143,043 B1 | 11/2006 | Vandermeijden | |
| 7,145,554 B2 | 12/2006 | Bachmann | |
| 7,170,496 B2 | 1/2007 | Middleton | |
| 7,174,175 B2 | 2/2007 | Uang et al. | |
| 7,181,240 B2 | 2/2007 | Kawamoto | |
| 7,218,249 B2 | 5/2007 | Chadha | |
| 7,260,259 B2 | 8/2007 | Lengen | |
| 7,382,871 B1 | 6/2008 | Ure | |
| 2001/0018351 A1 | 8/2001 | Hino et al. | |
| 2001/0030668 A1 | 10/2001 | Erten et al. | |
| 2001/0048413 A1 | 12/2001 | Tabata | |
| 2002/0065662 A1 | 5/2002 | Sherman | |
| 2002/0180698 A1 | 12/2002 | Kaelbling | |
| 2003/0030573 A1 | 2/2003 | Ure | |
| 2003/0048262 A1 | 3/2003 | Wu et al. | |
| 2003/0122784 A1 | 7/2003 | Shkolnikov | |
| 2003/0193478 A1 | 10/2003 | Ng et al. | |
| 2003/0204403 A1 | 10/2003 | Browning | |
| 2003/0216915 A1 | 11/2003 | Xie | |
| 2004/0056844 A1 | 3/2004 | Gutowitz et al. | |
| 2004/0204011 A1 | 10/2004 | Lyustin et al. | |
| 2005/0084079 A1 | 4/2005 | Lang | |
| 2005/0131687 A1 | 6/2005 | Sorrentino | |
| 2005/0181777 A1 | 8/2005 | Kim | |
| 2006/0073818 A1 | 4/2006 | Scott | |
| 2006/0172764 A1 | 8/2006 | Makino | |
| 2006/0190256 A1 | 8/2006 | Stephanick et al. | |
| 2007/0188472 A1 | 8/2007 | Ghassabian | |
| 2007/0200827 A1 | 8/2007 | Samal | |
| 2008/0045247 A1 | 2/2008 | Wilson | |
| 2008/0109432 A1 | 5/2008 | Ostergaard et al. | |
| 2008/0141125 A1 | 6/2008 | Ghassabian | |

FOREIGN PATENT DOCUMENTS

| | | |
|---|---|---|
| EP | 0810515 | 5/1997 |
| EP | 0840287 | 5/1998 |
| EP | 0898223 | 2/1999 |
| EP | 0949578 | 10/1999 |
| EP | 1109384 | 6/2001 |
| EP | 1164774 | 12/2001 |
| EP | 1271900 | 1/2003 |
| EP | 1383034 | 1/2004 |
| EP | 1699065 | 9/2006 |
| FR | 2840488 | 12/2003 |
| GB | 1320895 | 6/1973 |
| GB | 2360622 | 9/2001 |
| GB | 2378554 | 2/2003 |
| GB | 2406476 | 3/2005 |
| JP | 3156627 | 4/1991 |
| JP | 4330830 | 11/1992 |
| JP | 3007007 U | 11/1994 |
| JP | 7160387 | 6/1995 |
| JP | 8275239 | 10/1996 |
| JP | 10319879 | 4/1998 |
| JP | 11039078 | 2/1999 |
| JP | 11095792 | 4/1999 |
| JP | 11134096 | 5/1999 |
| JP | 11184609 | 7/1999 |
| JP | 2000068882 | 3/2000 |
| JP | 2000069149 | 3/2000 |
| JP | 2000152202 | 5/2000 |
| JP | 2000242402 | 8/2000 |
| JP | 2000349865 | 12/2000 |
| JP | 2001016635 | 1/2001 |
| JP | 2001109740 | 4/2001 |
| WO | WO 97/04580 | 2/1997 |
| WO | WO 97/04580 | 6/1997 |
| WO | WO 97/16935 | 9/1997 |
| WO | WO 98/35481 | 8/1998 |
| WO | WO 98/58346 | 12/1998 |
| WO | WO 99/15952 | 4/1999 |
| WO | WO 99/25152 | 5/1999 |
| WO | WO 01/31788 | 5/2001 |
| WO | WO 01/82043 | 11/2001 |
| WO | WO 02/08880 | 1/2002 |
| WO | WO 02/061558 | 8/2002 |
| WO | WO 03/007288 | 1/2003 |
| WO | WO 2004/095414 | 4/2004 |
| WO | WO 2005/122401 | 12/2005 |

OTHER PUBLICATIONS

U.S. International Search Report: Jan. 3, 2001.

European Search Report from corresponding European Application No. 08806962.0 dated Nov. 17, 2010.

Mona Singh of Ericsson, Inc.; Method for aiding speech recognition; Nov. 10, 2000.

* cited by examiner

| FINGERPRINT | INDEX | SINGLE TAP | DOUBLE TAP | HOLD IN PLACE | GLIDE | ETC... |
|---|---|---|---|---|---|---|
| 47913220-01 | | NUMBER→0 | NUMBER→6 | FUNCTION 1 | FUNCTION 11 | |
| 47913220-03 | | NUMBER→2 | NUMBER→7 | FUNCTION 3 | FUNCTION 13 | |
| 47913220-09 | | LETTER→I | LETTER→S | SYMBOL→# | FUNCTION CAPS | |
| 527212208 | | ACTIVITY X | ... | | | |
| ... | | | | | | |

MAPPING TABLE

FIG.2

DISPLAY

INTEGRATED KEYPAD SYSTEM

RELATED APPLICATIONS

This application is a continuation of U.S. patent application Ser. No. 11/157,203, filed Jun. 20, 2005, which is a continuation of U.S. National Phase application Ser. No. 10/111,888, filed on Apr. 26, 2002, having a 371 date of Sep. 5, 2002, which is a National Phase Application of PCT Patent Application No. PCT/US00/29647, filed on Oct. 27, 2000, which in turn claims the benefit of priority from U.S. Provisional Patent Application Ser. Nos. 60/163,996, filed on Oct. 27, 1999; 60/164,656, filed on Nov. 4, 1999; 60/164,597, filed on Nov. 10, 1999; 60/169,149, filed on 10 Dec. 6, 1999; 60/194,767, filed on Apr. 3, 2000; 60/208,619. filed on Jun. 1, 2000; 60/220,578, filed on Jul. 25, 2000; the entirety of which are all incorporated by reference herein as fully as if set forth in their entirety.

FIELD OF THE INVENTION

This invention relates to keypad, finger, hand, speech, lips, face and other detection systems, and more specifically to a keypad (e.g. standard telephone keypad), having a finger pad recognition device which may be used in combination with the above-mentioned recognition systems, in order that full text and functions input can be provided in a natural, easy and quick manner.

BACKGROUND OF THE INVENTION

Miniaturization has been a key component to recent technological advancement, enabling production of many devices that would otherwise be impracticable for reasons of size alone. Thus, we now have desktop computers that are more powerful and much smaller than their ancestor mainframes. Also, digital clocks, video games and common appliances farther illustrate the profit of miniaturization. In fact, the very essence of, for example, portable computers and cellular phones is their size as a primary feature.

Yet, primarily because of human constraints, there are many obstacles to the growth of miniaturization in several areas. For example, it may be desirable to have a portable computer that fits in one's wallet, but such a computer would not be useable without a large input device that enables human interaction with the computer. In other words, complex miniature computers and devices, such as cellular phones (now, also used for the Internet, email, m-commerce, SMS (Short Massage Services), etc.), notebooks and PDAs, require keyboards, numeric pads or other input devices to allow the user to enter a phone number, send e-mail or transcribe a letter, etc. Thus, as advanced as miniaturization technology may get, there are other human factors involved that prevent certain devices from realizing a truly miniature state.

As is well known, the key feature for a successful technological product, is its easily manipulations. For above-mentioned instruments and similar devices, a quickly, easily and most importantly, naturally, full text and function entry system is vital.

The telephone-type keypad, that people are familiar with, is the most common input device for small electronic and telecommunications instruments. It is integrated in many electronic devices such as mobile and wired telephones, PDAs, notebooks, laptops, faxes, remote controllers of TVs or other electronic devices, cameras, etc. This keypad usually has twelve keys, while the number of characters and functions keys used for writing texts or messages may be seven times this number. For example a computer keyboard has more than eighty keys, while some of those keys are used for two characters, symbols, or functions.

Because the telephone keypad has an insufficient number of keys (e.g. mobile phone keypad), each key of a standard telephone keypad contains a group of characters and usually one number. Usage of the Internet or even entering a short message, engages a lot of complexity for the consumer.

Proposals have been put forward to solve this fundamental man-machine-interface problem of how to quickly and easily enter text and functions using small communication devices.

One solution is to provide multiple presses of a single key for selecting a letter or symbol among those represented by a key. This system is currently used in most mobile phone keypads. This is a time consuming method and it frustrates the user.

To improve that system, word disambiguating software products are developed. A dictionary database and language model are used to scan and present possible words according to keys pressed. Later the user selects the desired word among presented possibilities. Such approach engages a lot of problems such as out-of-vocabulary words or obliging the user to concentrate for selecting a desired word. In addition, entering numbers or single characters are again time consuming procedures.

External miniaturized keyboards are also produced to overcome the problem but they oblige the user to carry two different instruments, interfering with the basic idea of small electronic products, which is their easy portability.

One recent technology that has attempted to overcome such limitations is voice/speech-recognition technology. Voice recognition is the process of recognizing one or more voice patterns from an individual's voice as a corresponding computer input command, word, or function. For example, rather than typing a letter on a keyboard a user speaks that letter, wherein the recognition device associates the voice pattern of that letter with the corresponding computer input character of that letter. Thus, individuals may operate devices in this manner without an input device since the user's voice provides all of the input. Unfortunately, considering the many complex aspects of an individual's voice, there is yet a recognition device that can accurately recognize voice patterns at a sufficient level where input devices can be completely replaced.

Additionally, several letters such as "B" and "P", or "D" and "T", can easily be confused by a speech engine. This is not necessarily a shortcoming of the engine as these letters can easily be confused by the humans as well. Hereafter, a list of some of the problems and disadvantages concerning voice/speech recognition systems;

Only for language, mostly English

Recognizing only one person's voice

Outside noise disturbance (especially when using mobile telecommunication instruments)

Not good for devices with small displays because of correction inconvenience (especially when using instruments with small LCDs, such as mobile phones)

Many mistakes may occur when speaking single words (discontinuous speaking)

Similar pronunciation for different words (e.g. two, to, too)

Not predicting the user intention when writing numbers (e.g. twenty four, 24)

Not predicting the user intention when writing mixture of numbers and symbols (e.g. six by four, 6 by 4, 6×4)

Difficulty to distinguish between letters (e.g. B, P)

Moreover, notwithstanding the miniaturization issue, portable and other electronic devices have many security and efficiency problems. For example, an individual who misplaces or loses a cellular phone must rush to disconnect his or her communications service before a thief or other person uses the phone to generate unauthorized charges. One known method for preventing such unauthorized use is to lock the cellular phone or other device with a code system. Although, effective in many cases, this system is painstaking and inefficient for the true owner, who must activate the phone via a lengthy process before dialing. Similarly, there is no simple method for preventing unauthorized use of many electronic devices without first locking the device with a code system or other time consuming and inefficient process.

Therefore, what is needed is a technology that resolves the human constraint Dilemma mentioned above, so that miniaturization can continue to realize its true potential. Furthermore, such a technology should also provide means for a more secure and efficient mechanism that can prevent unauthorized use of devices, among other things, as compared with the prior art. In addition, a technology that improves the reliability of voice recognition technology is desirable as well. What is needed, is preferably, a character-by character data entry method, using familiar input devices with limited number of keys (e.g. telephone keypad), wherein each key contains a group of characters, symbols and commands existing on computer keyboards or similar devices, combined with some of other recognition systems such as finger, voice, speech, lip, eye, face, etc., to enable the identification of individual characters from individual key entry actions.

SUMMARY OF THE INVENTION

A fingerprint detection device is provided, comprising one or more electronic pads that are configured to recognize pattern differences in each of a user's fingers. Such patterns relate to finger characteristics (such as size, shape, color, etc.), of entire fingers or portions of them. The patterns also relate to other information such as characteristics of the surface of the fingertips (fingerprint, size, shape), nails (shape, size, brilliance), etc. Such pattern differences can in turn be utilized communicatively so that human input can be transmitted to an electronic device via the process of touching one's fingers to the fingerprint detection device. Thus, an individual can use one's fingers in conjunction with a fingerprint detection device in order to input a phone number to a phone device, enter characters to a computer, trigger various macros or functions with a PDA, etc.

Initially, the fingerprint detection device must be programmed or 'taught' so that it maps a particular finger with a corresponding symbol or function, such as a number, letter, macro or other activity. Thus, for example, one can use this method to map a distinct number to each of one's fingers (e.g. the numbers 0 to 9 comprise 10 Arabic digits, which may correspond to each one of a person's ten fingers) and then be able to dial phone numbers solely with one's hands and a fingerpad. This saves space, by requiring only one pad as opposed to many numeric keys.

Notably, more than one symbol or function can be mapped to each finger. For example, the fingerprint detection device is configured, according to one embodiment of the invention, to interpret a double tap with a particular finger to correspond to one number, while at the same time a single tap with the same finger can correspond to another number.

Illustratively, using an index finger with one tap can correspond to the number '2' and the same finger used with two taps can correspond to the number '7.' In turn, all ten Arabic digits can be inputted with one hand and one fingerprint pad. Similarly, one can expand on this method to input letters, symbols or other functions.

In alternative embodiments, each finger is mapped to a different symbol or function based on the location of the finger, such as a different corner of the electronic pad. Thus, a tap in the upper right hand corner of the electronic pad will be interpreted differently than the lower right hand corner, etc. Also, more than one pad can be provided, if desired, to accomplish the same purpose.

One main advantage of this fingerprint detection device is its size. Rather than having a large numeric keypad for a phone, one can use a smaller fingerprint pad, using the methods discussed above. Similarly, computer keyboards can be replaced or modified, as well as PDA input devices, etc.

According to one embodiment, the fingerprint detection device is configured to distinguish between fingers based on their fingerprints. As such, this provides the user with a security advantage since the fingerpad would only operate based on a particular finger and is rendered useless in the hands of an unauthorized user.

According to yet another embodiment, the finger detection device detects biological differences between characteristics of fingers via a method other than fingerprint detection. These biological differences include, size, shape, position, temperature, etc. Thus, for example, the finger detection device can be configured to quickly distinguish one finger from another based on its size and shape. This process avoids the lengthy and complex task of scanning a full or partial fingerprint. It is understood that for finger print or finger biological recognition, different detection systems and devices such as sensitive touchpads of any kind, touch screens, thermal, optical or other recognition means may be used.

According to yet another embodiment of the invention, the detection device is configured to accept multiple forms of input to enhance accuracy and ease of use. For example, the detection device can be configured as both a finger detection and voice-recognition device, wherein the detection device identifies a corresponding character or function based on input from both an individual's finger and voice patterns.

Not only does this method enhance accuracy, but it also enables individuals to more easily and quickly input distinct characters, words, and/or functions. Illustratively, without this method, an individual who wishes to use his or her fingers to input alphanumeric characters must assign three or more letters or symbols to each finger since there are many more letters and numbers than human fingers. It is thereafter not sufficient to merely tap one's finger when entering a character since the input device still needs to distinguish between the several characters assigned to that finger. Thus, providing multiple forms of input resolves this problem. As an individual places one's finger on the detection pad he or she may also speak the desired letter or function. The voice of the individual enables the detection device to distinguish between the many characters assigned to a particular finger. In addition, the limitations of voice recognition are avoided since the finger detection device narrows down the voice-recognition to one of a few letters or symbols rather than a much larger scope. For example, by using this system combined with telephone keypad character arrangement, letters "B" and "P" will not be misrecognized by the voice recognition engine, since they are separately located on two different groups (e.g. keys) 2, and 7. The same is true for the letters "D" and "T", which are located on the keys 3, and 8, respectively.

It is understood that the above-described embodiment can be configured to utilize voice-recognition with any of the finger detection devices described herein. For example, voice recognition can be combined to operate with fingerprint detection. Further, voice recognition can also be combined to operate with finger detection based on biological characteristics other than fingerprints. It can also be configured to operate with the optical scanning devices, described herein, etc.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings in which like reference characters denote similar elements throughout the several views:

FIG. 2 is a mapping table portion of a database, according to one embodiment of the invention, which illustrates a particular finger being logically mapped to one or more corresponding functions or symbols;

DETAILED DESCRIPTION OF THE INVENTION

Figure 1:
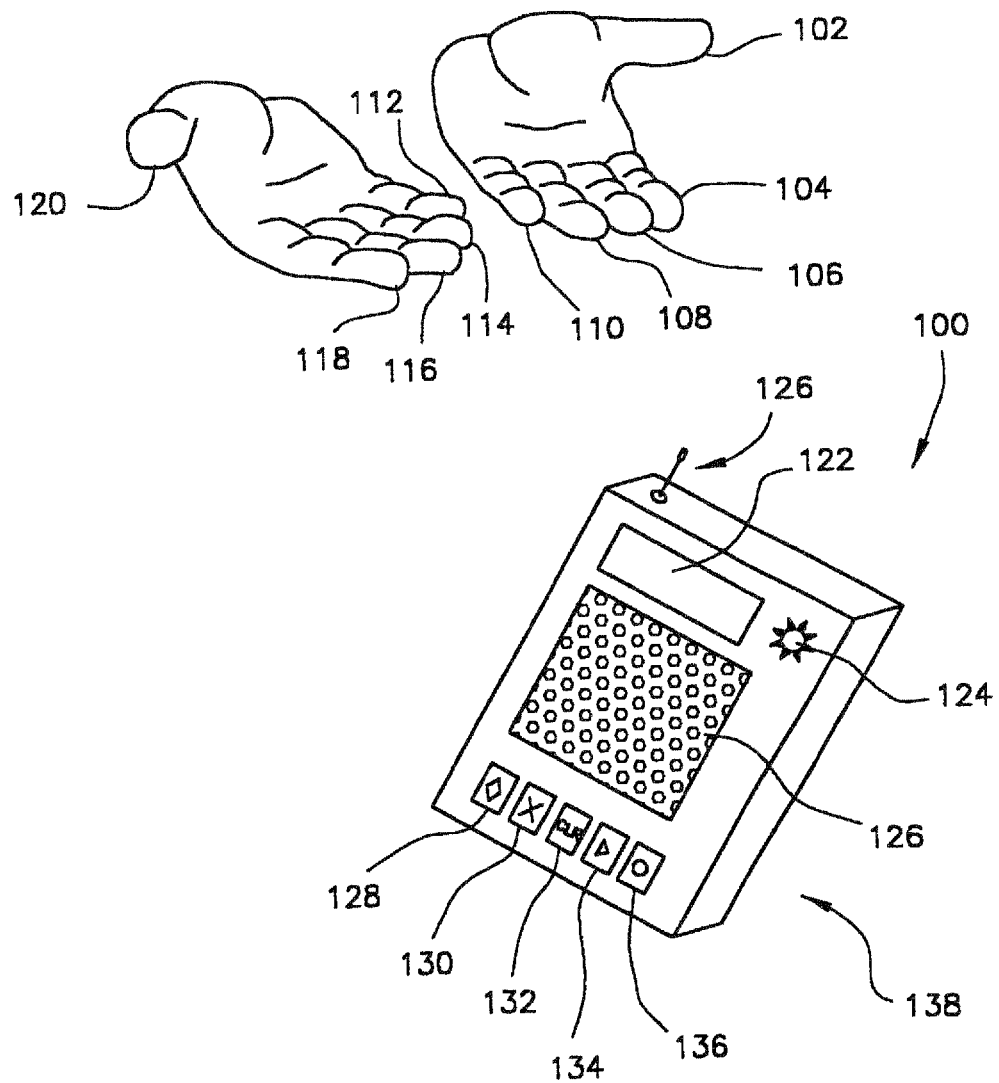
FIG. 1 shows a fingerprint detection interface, according to one embodiment of the invention, for enabling inputting of numbers, letters, or other symbols and commands to a device via fingerprints or other biological differences among fingers.

With initial reference to FIG. 1, a fingerprint detection interface 100 is shown, according to one embodiment of the invention, comprising a fingerprint detection pad 126, which is configured to recognize pattern differences in each of a user's fingers. Such pattern differences can in turn be utilized communicatively so that human input can be electronically transmitted to an electronic device via the process of touching one's fingers to the fingerprint detection device.

Fingerprint detection interface 100 further comprises, according to one embodiment of the invention, a display screen 122, an indicator light 124, command buttons 128-136, switches 138, and wireless communications means 126. Briefly, an individual using a plurality of fingers, such as fingers 102-120, touches fingerprint detection pad 126 in order to provide an input signal, whereas fingerprint detection device 100 in turn transmits that signal via communications means 126 to another device, such as a phone or computer. The type of input signal provided is based on a combination of factors, including, which finger or portion of a finger is used and what motion is done with that finger. For example, an individual can double tap his or her right thumb to provide one signal and swipe his or her left index finger to provide another signal. The method and use of such fingerprint detection will be described in more detail below. Thus, the fingerprint detection device can be used in place of a more bulky computer keyboard, phone numeric pad, or any other input device.

With continued reference to FIG. 1, display screen 122 is provided as an optional visual indication of the fingerprint detection mechanism. For example, an individual inputting a phone number via the fingerprint device can see the phone number displayed on the display screen as it is detected. According to one embodiment, the display screen acts as a buffer, wherein the individual can view the display screen in order to correct any errors and subsequently transmit the buffered information to the corresponding device, such as a phone. As will be explained below, command buttons 132 and 134 can be used for this purpose.

In addition, indicator light 124 can be configured to flash and/or beep to indicate the operation of the fingerprint device. Thus, an individual can use the fingerprint pad without viewing the display screen, and the indicator light will flash or beep as the fingerprint detection mechanism for each finger is completed. This signals the individual user with an indication so that he or she may continue to another finger or signal.

As mentioned above, command buttons 128-136 provide several useful functions. For example, command buttons 128 and 130 can be used to initiate or program the device. Understandably, the fingerprint detection device must be programmed or 'taught' so that it maps a particular fingerprint with a corresponding symbol or function, such as a number, letter, macro or other activity. Thus, command buttons 128 and 130 can function as record and select buttons so that one or more symbols or functions can be selected and mapped with a particular fingerprint. Furthermore, command buttons 132 and 134 can be used to respectively clear and transmit the information in a buffer or on the display screen. Similarly, command button 136 can instruct the fingerprint device to bypass a buffer system and directly transmit all information to the corresponding device, such as a phone. Of course, in one embodiment, there may be no command buttons, wherein the entire functionality of the system is accomplished via the fingerprint pad.

In addition, switches 138 provide additional functions such as a power on/off switch, detection mode switch, individual user switch, etc. For example, the fingerprint device can be designed to map the fingerprints of more than one individual. For efficiency purposes, one of the switches can be configured to indicate which individual is using the finerprint device, reducing the processing time of the device by limiting the number of fingerprints that have to be matched. Moreover, a detection mode switch can be utilized to indicate the primary use, such as whether the fingerprints should be interpreted as numbers, letters, functions, etc. Thus, when typing a letter, the switch can instruct the device to map single finger taps to commons letters, whereas when dialing a phone number, the switch can instruct the device to map single finger taps to numbers, etc.

It is understood that the fingerprint device as shown is but one embodiment of the invention and is not limited as such. In an alternative embodiment, the fingerprint device can be incorporated as part of a computer or telephone, rather than a separate external device. In addition, any technology aside for wireless communication can be used.

With reference to FIG. 2, a mapping table 200 is shown, which illustrates how a database system can map individual fingerprints to one or more corresponding symbols or functions. Mapping table 200, as shown according to one embodiment, comprises a Fingerprint ID index 202 for storing fingerprints in the form of numerical identification numbers, such as identification number 212. Furthermore, mapping table 200 comprises mapping indexes 204-210 for assigning a particular motion to a symbol of function.

Illustratively, tapping once with a finger corresponding to identification number 212 may produce the number '0,' whereas the same finger with a double tap may produce the number '6.' In turn, all ten Arabic digits can be inputted with one hand and one fingerprint pad, by only using single and double taps. Similarly, one can expand on this method to input letters, symbols or other functions, such as by using glide motion 210, etc.

Of course, the mapping table can be instructed to only map one of several fingers, entirely or partially, as needed. Similarly, the mapping table can assign the same function or symbol to multiple fingers or the same finger on corresponding hands, etc.

Notably, the mapping table of FIG. 2 can be stored locally at the fingerprint device, remotely at a database system, or even centrally at a central station. Indeed, storing the mapping data at a central station enables an individual to use nearly any fingerprint device in the central station range without having to re-program his or her fingerprint codes. Of course, this feature may sacrifice some of the security benefits of the fingerprint device.

Figure 3:
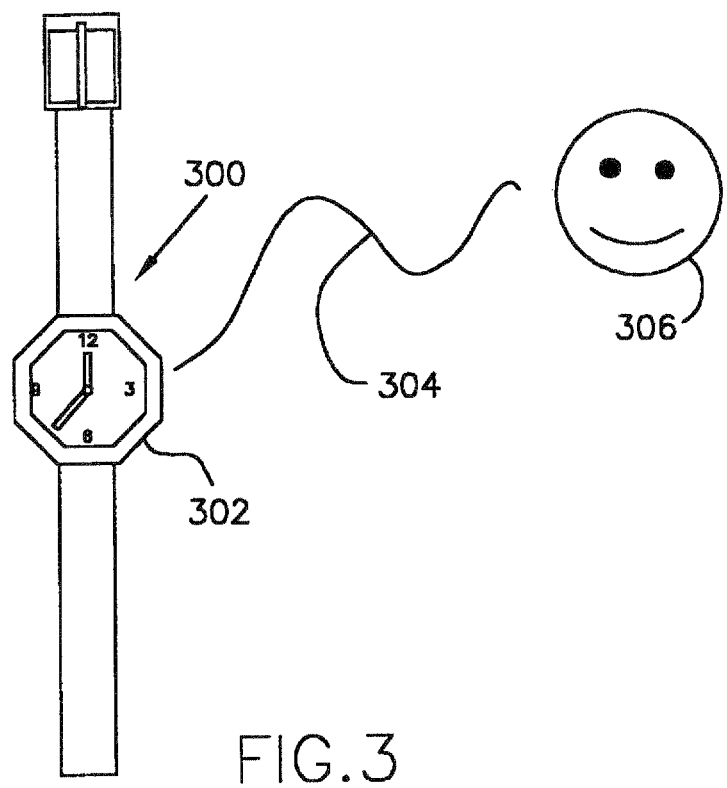
FIG. 3 is a wristwatch having a fingerprint detection pad, according to one embodiment of the invention, so that the wristwatch can be configured to operate as a radio, phone, or other device without requiring a console, numeric keypad or other bulky input device.

With reference to FIG. 3, a traditional watch 300 is shown, having a fingerprint detection pad 302. According to this embodiment, this pad can be used to incorporate a phone, radio, or other device with the watch without having to include a bulky input device. Thus, a user 306 can attach a headphone/microphone 304 to effortlessly use such a watch as a phone, etc.

Figure 4:
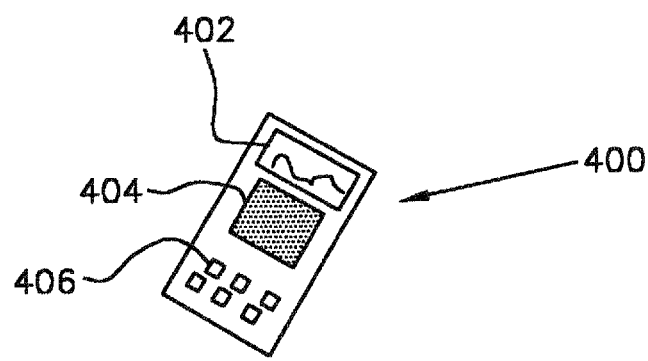
FIG. 4 is a calculator having a fingerprint detection pad, according to one embodiment of the invention, so that individuals can enter functions and other commands via fingerprint detection.

Similarly, with reference to FIG. 4, a calculator 400 is shown, having a fingerprint detection pad 404 as well as a display screen 402 and command buttons 406. Thus, a small calculator can now incorporate more functions than many large scientific or computer calculators in a much smaller space, via the fingerprint pad. Here various fingerprints and motions can be mapped to functions and mathematics calculations, similar to the methods used above.

Figure 5:
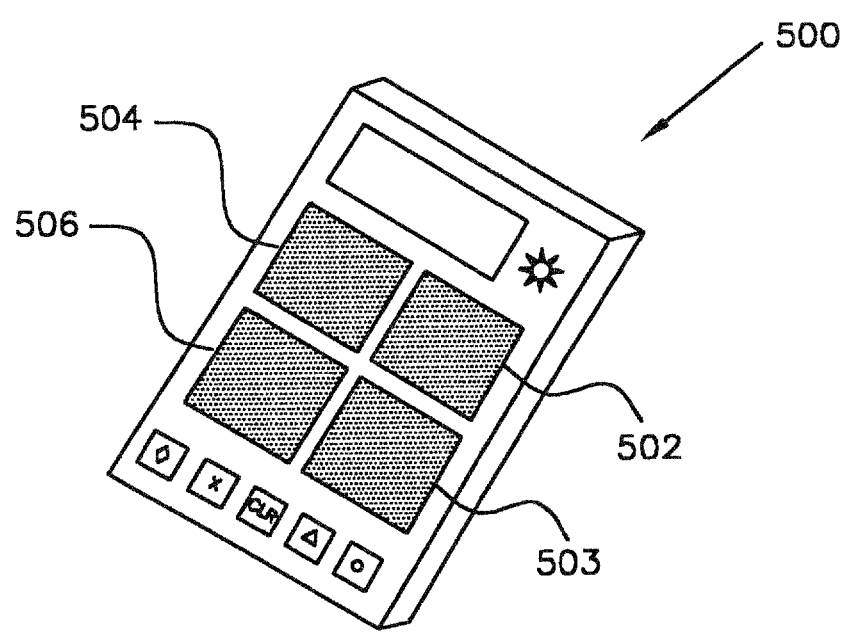
FIG. 5 shows the fingerprint detection interface of FIG. 1, according to one embodiment of the invention, having four fingerprint pads.

FIG. 5 illustrates a fingerprint detection device 500, similar to the device 100 of FIG. 1, but with four fingerprint pads 502-508. According to one embodiment, rather than using different motions, such as double taps or swipes, the user can use multiple fingerprint pads to correspond with different symbols or functions. Of course, such a device can incorporate the use of both multiple fingerprint pads and multiple motions, etc. Similarly, rather than having four fingerprint pads, one pad can be used, but having sensors at each of the four corners of that one pad.

Figure 6A:
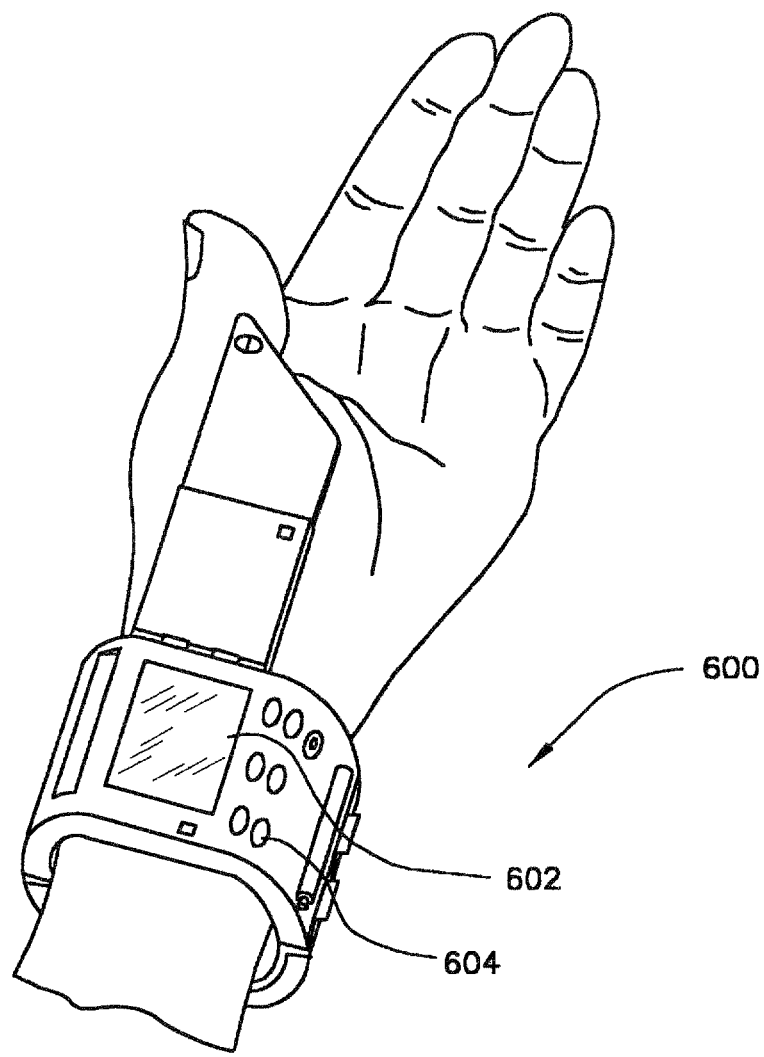
FIG. 6a is a wrist mounted telephone device, according to one embodiment of the invention, having a fingerprint pad for dialing, in place of a numeric pad.

FIG. 6a illustrates a wrist mounted telephone device 600. Rather than having a bulky numeric pad to dial phone numbers, here a fingerprint pad 602 is used, along with optional command buttons 604, to accomplish the same task in less space.

Figure 6B:
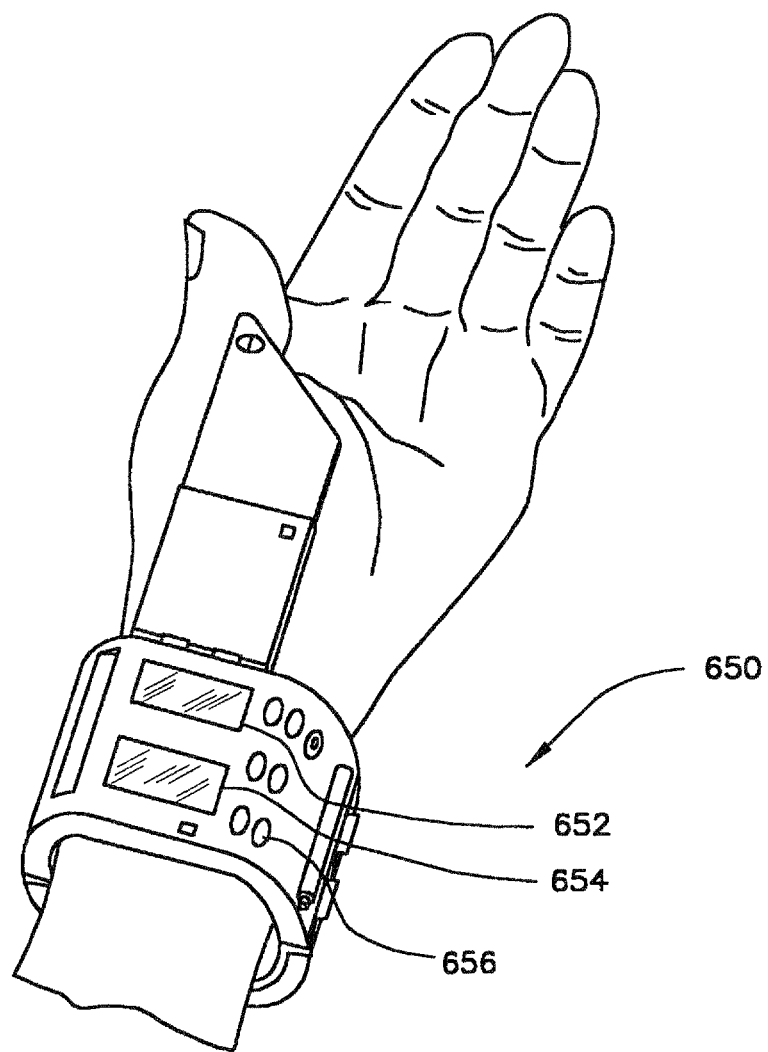
FIG. 6b shows the wrist mounted telephone device of FIG. 6a, having two fingerprint pads for additional functionality.

Similarly, FIG. 6b shows another wrist mounted telephone device 650, but with two fingerprint pads 652 and 654, as well as optional command buttons 656. As described above, the added one or more fingerprint pads can be configured to increase usability, etc. Such fingerprint pads are more convenient than having a larger numeric pad, particularly as this device is situated on one's wrist.

It is understood that the fingerprint detection device described above and herein can be configured to operate in one of many environments. For example, individual fingers can be mapped to musical notes, wherein an individual can play music by tapping his or her fingers on a fingerprint pad. According to this embodiment, seven fingers can be assigned to seven different notes or more, and different pads or different portions of one finger or one pad can be assigned to a higher or lower tone, etc.

In yet another embodiment the fingerprint device can be configured to scan only a minimal portion of one's finger, rather than the entire finger. In this embodiment, the device is not necessarily concerned with security measures, but with distinguishing one finger from the other finger or one portion of a finger from another portion of same finger or another finger. Therefore, only the minimum amount of scanning is needed, just enough to know which finger or portion of it is being used. Of course, the device can be configured to scan more or less depending on the priorities of security vs. speed.

In yet another embodiment of the invention, a device can be configured to scan for biological differences among an individual's fingers, other than fingerprints. These biological differences include, size, shape, position, temperature, etc. Thus, for example, the fingerprint detection device can be configured to quickly distinguish one finger from another based on its size and shape, etc. This process avoids the lengthy and complex task of scanning a full or partial fingerprint.

According to one embodiment, this process of scanning for biological differences is only concerned with distinguishing between fingers of one person. Thus, the fingerprint detection device only needs to decipher the shape and/or size of a finger to distinguish a thumb or a portion of a thumb from an index finger or a portion of an index finger, for example, from among five fingers of a hand or the ten fingers of two hands. This is a simpler and quicker task than having to distinguish the thumb of one person from the thumb of another. This process may be accomplished via a database of multiple thumbs, index fingers, etc. As a person touches the fingerprint pad, the detection device matches that finger with the many 'template' fingers in the database. A finger that matches most nearly to a thumb, for example, would be categorized as a thumb, etc. Of course, individuals may program or "teach" the system to recognize their individual fingers more efficiently.

Figure 7:
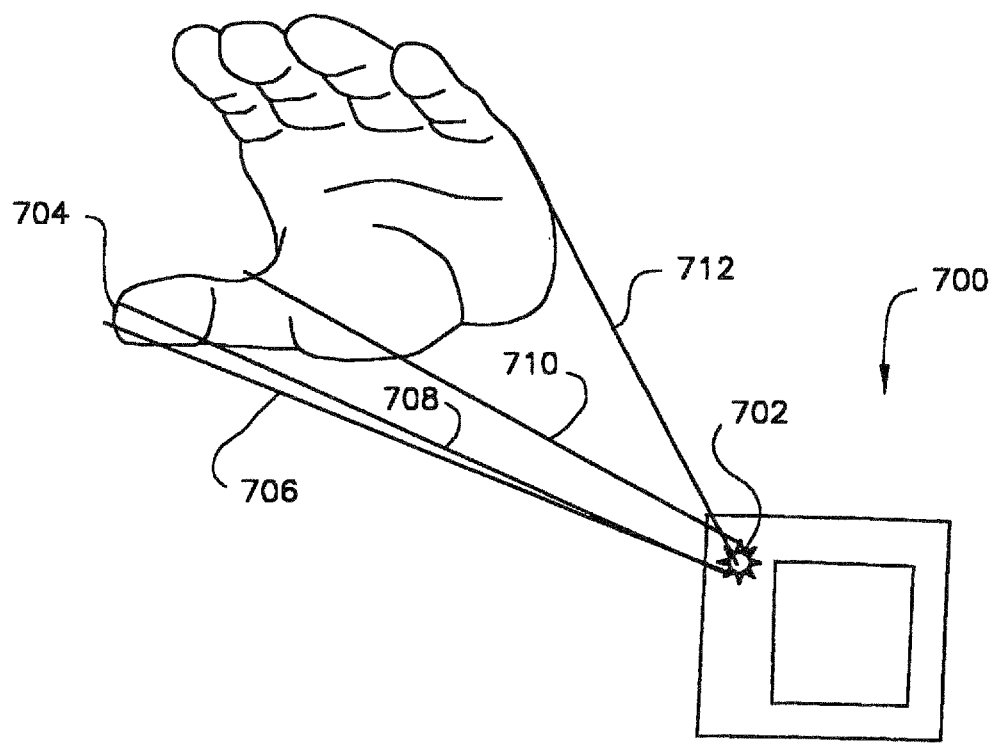
FIG. 7 shows an optical finger detection device, according to one embodiment of the invention, for capturing images of fingers, hands, or portions of fingers or hands in order to detect a particular corresponding character, number, function, or command.

With reference to FIG. 7, a remote finger detection device 700 is shown according to yet another embodiment of the invention. Detection device 700 comprises an optical or other scanning device 702 for detecting and scanning fingers and finger motions without the use of the fingerprint pad of the above mentioned embodiments. Scanning device 702 operates by capturing an image of a finger or a portion of a finger, such as finger 704, and analyzing the finger image against a database of finger images to determine if that finger is a thumb, index finger, etc. Such a database can be customized, based on user configuration, or generic, based upon known biological differences between the various fingers of a hand.

Thus, individuals can dial phone numbers or enter characters via the scanning device without touching a pad. In fact, an individual's fingers can be configured to operate as a remote control, wherein the scanning device would be connected to a device, such as a television. For example, an individual can signal with finger 704 to indicate that the volume of a television should be increased. Similarly, another finger can manipulate the channel control of a television. Indeed, the remote scanning device can be situated within any one or more of electronic appliances, light switches, water and bathroom fixtures, etc. In order to avoid unwanted activation of the detection device, an individual can point or signal with the desired finger so that the detection device knows that is should commence scanning.

With continued reference to FIG. 7, scanning lines 706-712 illustrate the scanning and detection process of one embodiment of this invention. Illustratively, one method of scanning involves configuring scanning device 702 to normally scan the entire finger 704 via normal scan lines 706 and 710. This process would compare the image of the entire scanned thumb against other generic or customized thumb images in the database, as mentioned above. Other factors, such as shape and position may also play a factor in the scanning process. Another scanning method configures scanning device 702 to narrowly scan finger 702, such that only a portion of finger 704 is scanned, as for example with scan lines 706 and 708. This is a quicker and possibly more efficient process since a smaller portion of the finger is scanned. Yet another method configures scanning device 702 to widely scan an entire hand or portion of a hand, as for example with scan lines 706 and 712. This process enables the detection device to look at a larger image to better identify finger 704.

For example, the scanning device may see that finger 704 is to the right of four other fingers of a hand and as such must be a thumb. This process may similarly be utilized to detect the other fingers of a hand, etc.

It is understood that the above-mentioned embodiments are only examples of many methods that can be used to detect and identify a finger, or different portions of a finger, via the system of this invention. For example, nail detection can be used according to one embodiment of this invention, wherein different fingers are identified based on differing nail structure, size or appearance.

It is understood that in order to enhance the security of the device, the scanning device, according to one embodiment of the invention, can be programmed or taught to better recognize the image of an individual's finger. One such programming method involves the scanning of each of an individual's fingers from several angles so as to generate a 3-dimensional computer image of the scanned fingers. This process enables the fingerprint detection device to better detect a finger or portions of it, regardless of whether it is positioned straight or sideways, etc., since it is a complete image of all angles of the finger. In addition, according to one embodiment, each finger can be assigned to a different character or function based on its position or direction, such as straight or sideways.

Another method of indication the direction of a finger, according to one embodiment, is to first position the finger normally, for regular scanning and/or detection. Then, the finger can be twitched to the side or upwards, to indicate a different input command, etc.

Furthermore, according to another embodiment, multiple fingers can be used together in addition to them being used separately. For example, an index finger can correspond to one letter or number, a thumb can correspond to another, and both a thumb an index finger used together can correspond to yet another character, number, etc.

According to another embodiment, the scanning device can be used in conjunction with a pad. Thus, the scanning of an individual's fingers begin before the pad is touched, but the complete scan is not executed until the finger touches the pad. This feature may be desirable for those who want the assurance that accidental finger motions will not activate the detection device. Furthermore, it is more comfortable to some, when there is a pad or other platform to rest one's fingers as he or she is dialing a phone number, for example. It is understood that the scanning could be made by the pad (e.g. sensitive pad of all kind) itself, creating two or three dimensional images. The images may be assigned to different symbols or functions. For example, touching the pad with a finger in upward position (e.g. tip) can correspond to a function or character and touching the pad with the same finger or another finger in regular position (e.g. flat) may correspond to another function or number.

According to yet another embodiment of the invention, the detection device is configured to accept multiple forms of input to enhance accuracy and ease of use. For example, the detection device can be configured as both a finger detection and voice-recognition device, wherein the detection device identifies a corresponding character or function based on input from both, an individual's finger and voice patterns.

Not only does this method enhance accuracy, but it also enables individuals to more easily and quickly input distinct characters, and/or functions. Illustratively, without this method, an individual who wishes to use his or her fingers to input alphanumeric characters must assign three or more letters or symbols to each finger since there are many more letters and numbers than human fingers. It is thereafter not sufficient to merely tap one's finger when entering a character since the input device still needs to distinguish between the several characters assigned to that finger. Thus, providing multiple forms of input resolves this problem.

As an individual places one's finger on the detection pad, he or she may also speak the desired letter or function. The voice of the individual enables the detection device to distinguish between the many characters assigned to a particular finger. In addition, the limitations of voice recognition are avoided since the finger detection device narrows down the voice-recognition to one of a few letters or symbols rather than a much larger scope.

Furthermore, using multiple forms of input is beneficial from a processing perspective as well. Even if only one function or character is assigned to each finger, using voice recognition, for example, eases the burden of the finger detection device by providing direction as to how to process the finger. Thus, a detection device can utilize information from both the voice and finger recognition devices to converge on an accurate detection result more quickly and with more accuracy.

Figure 8:
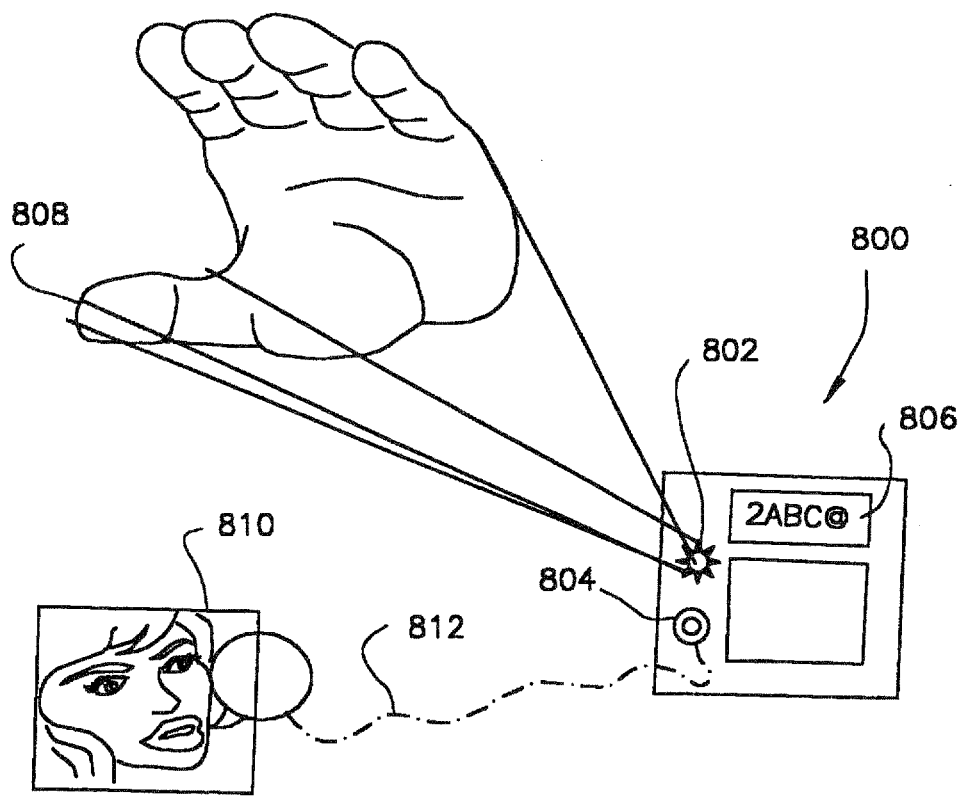
FIG. 8 shows a detection device that comprises both, optical finger detection means and voice recognition means, according to one embodiment of the invention.

With reference to FIG. 8, the above-mentioned detection device 800 is shown according to one embodiment of the invention. Detection device 800 comprises an optical scanning device 802 for detecting and scanning fingers and finger motions as discussed with reference to FIG. 7. Furthermore, FIG. 8 comprises a voice recognition device 804, for detecting voice patterns, and a display screen 806.

Illustratively, one method of providing input via detection device 800 is to first have a finger, such as finger 808, scanned by optical device 802. It is understood that in an alternative embodiment voice recognition or another form of scanning can be conducted first. Thereafter, in response to the recognition device, display screen 806 displays the one or more letters, symbols or functions associated with that finger. For example, finger 808 may be associated with the number 2, the letters A, B and C, and the symbol @. It is understood that the method of this embodiment can be configured to operate without display 806. Now, the individual, such as individual 810, has several options. One option is to tap finger 808 one or more times to indicate which of the four characters or symbols to select. Another option may be to hold finger 808 in place until the desired character or symbol flashes or provides another indication. Another option may be to use voice-recognition, as described above. According to this option, individual 810 provides a voice sample, corresponding to the desired character or symbol, and detection device 800 selects that symbol via voice recognition device 804.

This process overcomes many of the limitations of finger and voice detection technologies. By having two forms of input, such as both voice and finger patterns, the device is better able to isolate and identify the corresponding character or function, etc. For example, since the voice recognition device is only required to select from a small list of characters and/or symbols the limitations of inaccurate voice recognition is mostly avoided.

Figure 10:
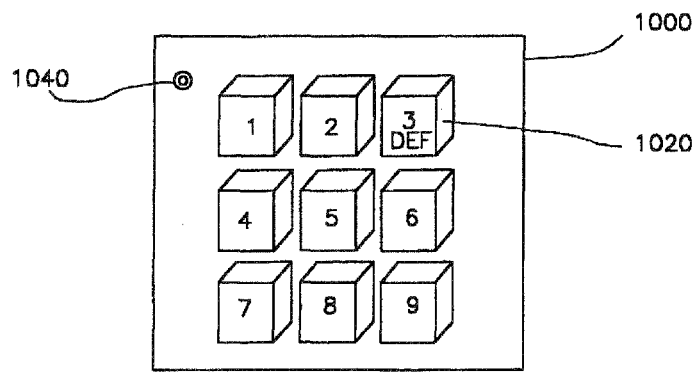
FIG. 10 shows a telephone keypad having a voice recognition device, according to one embodiment of this invention.

In fact, according to one embodiment of the invention, one of the forms of input can be via a numeric keypad or other standard input device, such as a telephone keypad. With reference to FIG. 10, a telephone keypad 1000 is shown having nine keys, such as key 1020, and a voice recognition device 1040. Thus, an individual can more easily select a letter or symbol from such a keypad by incorporating voice detection, for example, together with the input device. Illustratively, an individual can select the letter "E" on a phone keypad, via key 1020, by pressing the number '3' (1020) and saying "E,"

rather than pressing two or more keys to otherwise select that letter. This is a quick, easy, and, most importantly, natural system for selecting a letter.

It is understood that the above-described embodiment can further be configured to utilize voice-recognition with any of the finger detection devices described herein. For example, voice recognition can be combined to operate with fingerprint detection. Further, voice recognition can also be combined to operate with finger detection based on biological characteristics other than fingerprints. Voice recognition can also be configured to operate with any other device, such as eye direction recognition system, in addition to the optical scanning device described in FIG. 8.

Figure 9:
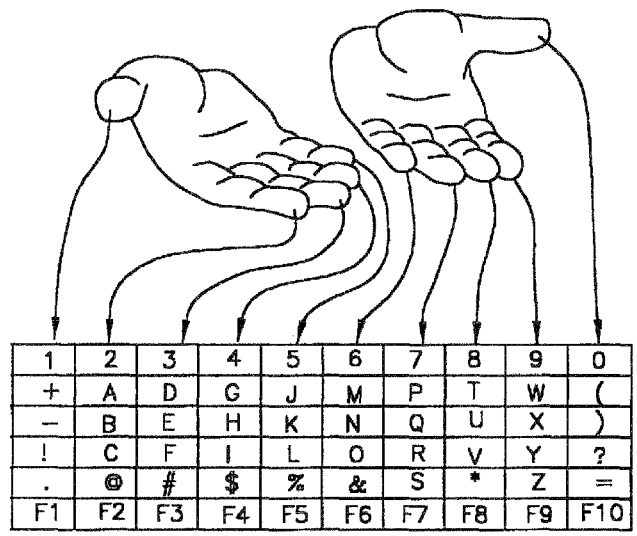
FIG. 9 shows a finger mapping table, according to one embodiment of this invention.

Notably, according to one embodiment of the invention, a finger detection device can be configured to assign all commonly used symbols and characters among the ten fingers of an individual's hand. Illustratively, FIG. 9 shows a sample mapping table, which maps all numbers, letters and many characters to different fingers of a hand. It is understood that there are many additional mapping formats and tables according to alternative embodiments of this invention.

Figure 11:
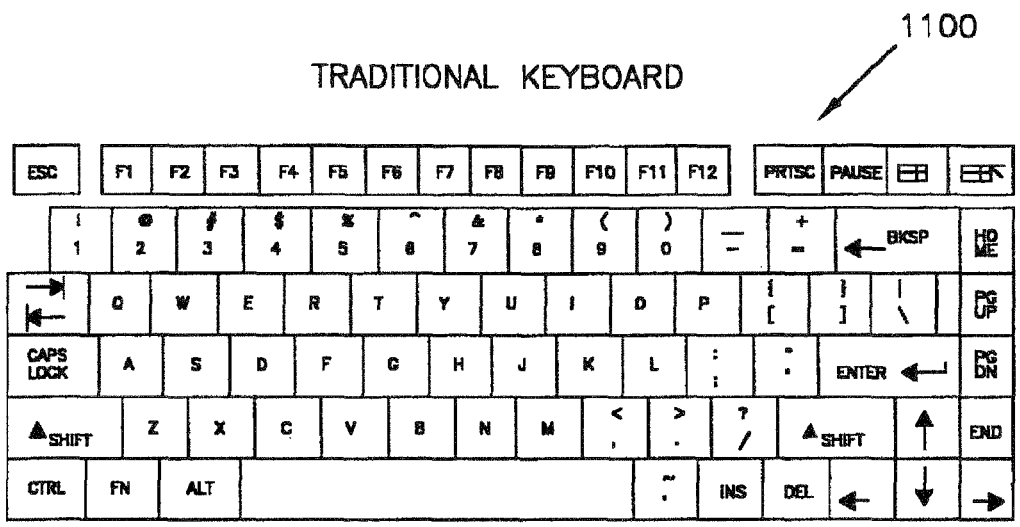
FIG. 11 shows a front view of a traditional keyboard.

According to yet another embodiment, the finger pad detection device of this invention can be configured to operate as a keyboard. Illustratively, with reference to FIG. 11, a traditional keyboard layout 1100 is shown having a plurality of keys. This traditional layout has several disadvantages. For example, although most typists are familiar with the layout and location of the various keys on a keyboard, it is still necessary to align one's hand in the proper position before initiating a typing sequence. Thus, a typist must initially place his or her left pinky on the letter 'A' and the next finger on the letter 'S' and so forth. Once this initial positioning is complete the typing sequence may begin, wherein the experienced typist knows which keys to press based on their relative location to the above-mentioned initial placement.

With this technique there is no need to view the keyboard, speeding up the typing process. Unfortunately, many typists often err in their initial placement, mistakenly placing the left pinky on the letter 'S' for example. This causes a faulty initial placement where, for example, each finger is mistakenly positioned one key to the right of its proper location. Thereafter, an entire typing sequence may be entered only to produce illegible output because the intended keys were mistakenly replaced by an adjacent key.

Figure 11A:
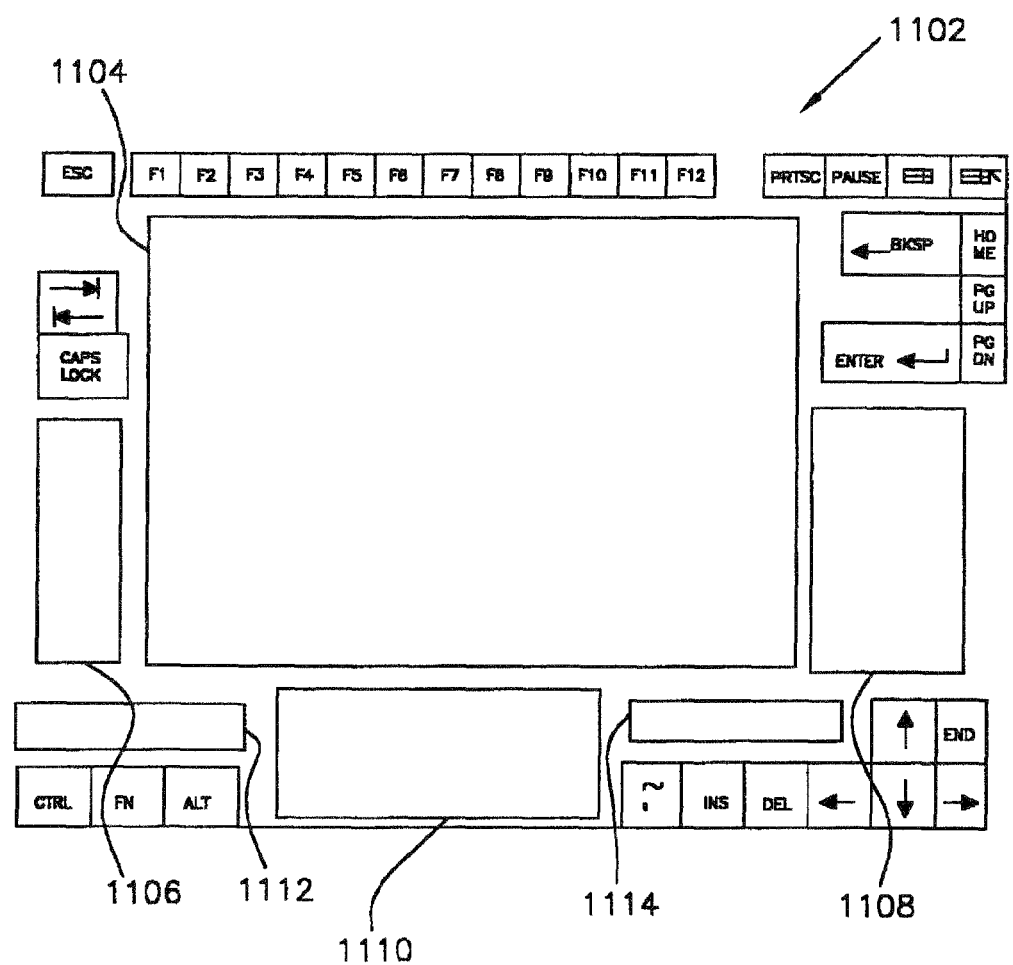
FIG. 11a shows the finger pad detection device of one embodiment of this invention configured as an enhanced keyboard and/or display device.

With reference to FIG. 11*a*, a finger pad keyboard 1102 is shown having a center finger pad section 1104 and five perimeter finger pad sections 1106-1114, according to one embodiment of this invention. The addition of finger pad sections 1104-1114 overcomes the limitations of the traditional keyboard 1100 with the added use of finger detection. Thus, for example, an individual's left pinky can permanently be assigned via finger detection to the letter 'A,' the next finger assigned to the letter 'S' and so forth. Rather than positioning one's fingers on the proper keys of a keyboard, as stated above, the finger pad dynamically calibrates the location of keys based on the position of one's fingers.

Indeed, with reference to center finger pad section 1104 there are no keys, but rather a flat pad. When a typist initially places his or her fingers on the center pad the detection device calibrates the location of the keys based on the location of the person's corresponding fingers. Thus, a typist can have the letters 'Q,' 'A,' and 'Z' assigned to his or her left pinky. Upon calibration, the location of the typist's pinky will correspond to the letter 'A' and the location below or above the letter 'A' will correspond respectively to the letters 'Z' and 'Q' when that area is touched by the left pinky. Similarly, the left pointer finger can be assigned to multiple letters, such as 'F', 'G,' 'T,' 'V' and so forth. The center finger pad uses finger detection and calibration location to determine dynamically which key is being pressed. According to one embodiment, the finger pad keyboard re-calibrates the position of the keys each time an individual removes his or her hand from the keyboard.

According to one embodiment of the invention, perimeter finger pad sections 1106-1114 correspond to various functions. For example, touching pad section 1108 with one's right pinky can correspond to the 'shift' key on a traditional keyboard. Similarly finger pad section 1110 can correspond to the space bar key of a traditional keyboard when touched with one's thumb. Alternatively, according to one embodiment, touching any of the finger pad sections with one's thumb can correspond to the space bar key.

According to yet another embodiment of the invention, center finger pad section 1104 can be configured to operate simultaneously as a display screen or video output device. Thus, both the monitor and keyboard of a computer, for example, can be integrated as one device. This is possible because the keys are replaced with finger detection pads, providing a flat or nearly flat surface for a display image.

In an alternative embodiment, the above mentioned integrated display screen can be configured to provide one or more displays corresponding to the use of the finger pad keyboard. For example, each time the keyboard calibrates itself based on the position of the typist's fingers the integrated display screen can display images of the corresponding keys in their calibrated location. In addition, the displayed images can highlight when pressed to indicate to the typist that a particular letter or command was detected. In addition, the integrated display can be configured to change its appearance based on different languages or arrangements of letters etc.

Figure 12:
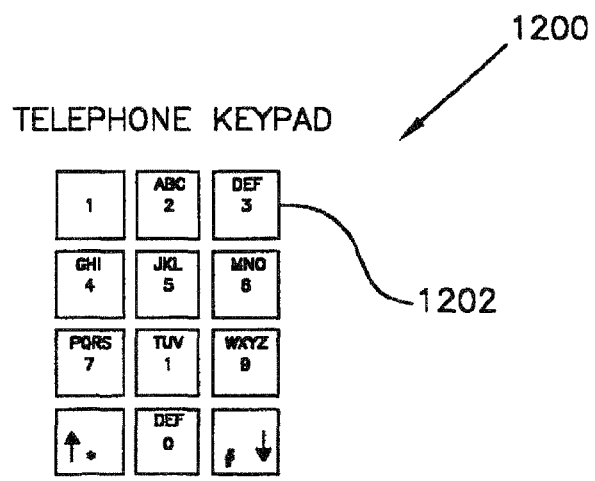
FIG. 12 shows a front view of a telephone keypad.

According to yet another embodiment of the invention, the finger pad detection device of this invention can be configured to operate as an enhanced keypad. Illustratively, with reference to FIG. 12, a traditional telephone keypad 1200 is shown, having twelve keys, such as key 1202. Since keypad 1202 has more than one symbol assigned to each key, multiple selections are required to select a particular symbol. Typically, such keypads assign numbers to each key by default. Thus, pressing key 1202 will automatically produce the number '3.' Since numbers are more frequently desired when using a keypad this has proved to be an efficient system. However, if a letter or other symbol is desired, the keypad or other system must be adjusted to temporarily remove the default setting. Naturally, this system is disadvantageous when both keys and letters are frequently needed since pressing a key only once is an ambiguous selection.

According to one embodiment of this invention, a finger detection keypad is provided (FIG. 10), wherein a different number, letter or function is assigned to some or all fingers of one's hand. Therefore, for example, pressing the key 1020 (FIG. 10) with one finger produces the number '3' and pressing the same key with another finger produces the letter 'D' and so forth. Thus, every symbol on each key of the keypad can be entered with only one key press.

According to one embodiment, the above mentioned finger detection keypad can be configured such that when a key is pressed the corresponding number is output by default. In order to output one of the corresponding letters one may use a particular assigned finger. Thus, a particular middle finger can be assigned to the middle letter of a keypad key, such as 'B' or 'E,' etc. Similarly a right finger to a right key letter and so on. All other fingers or a non-detected or assigned finger can correspond to the default number.

Figure 13:
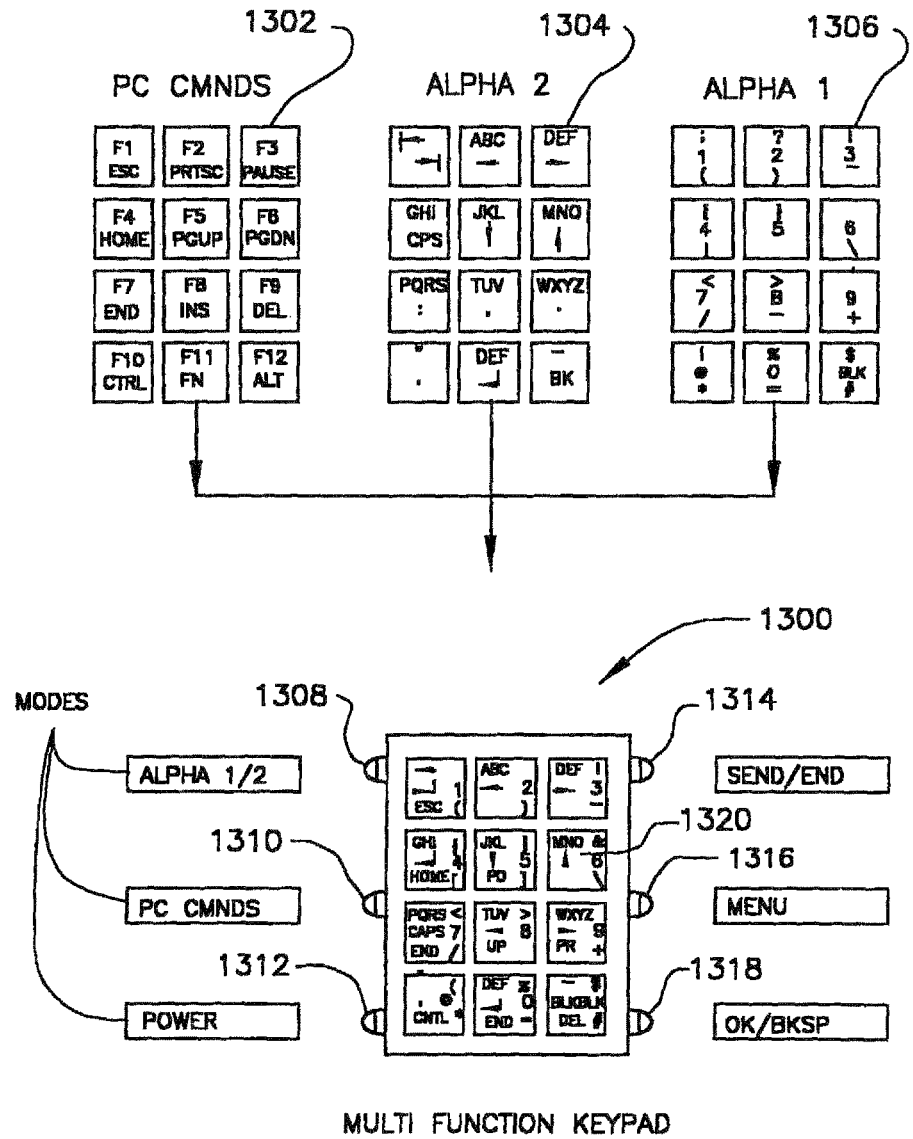
FIG. 13 shows an enhanced keypad device according to one embodiment of this invention, having multiple configurations.

With reference to FIG. 13, an enhanced multi-function keypad 1300 is shown, according to one embodiment of the invention. Keypad 1300 utilizes the finger detection system discussed above to integrate multiple keys, such as nearly every key of keyboard 1100 (FIG. 11) (e.g. standard keyboard), into the limited keys of a keypad (e.g. standard keypad). In FIG. 13, for example, these symbols and characters are arranged in three groups, alpha1 1306 (numeric) containing numbers and numeric symbols, alpha2 1304, containing alpha characters, symbols and functions used to edit texts, and finally PC commands 1302. It is understood that according to another embodiment of this invention, keypad 1300 can have more or less keys, etc. and still function according to the system described herein.

Keypad 1300 comprises a plurality of keys, such as key 1320, and a plurality of command buttons, including Alpha button 1308, PC command button 1310, Power button 1312, Send/End button 1314, Menu button 1316, and Execute button 1318. Briefly, these command buttons are configured to perform tasks such as switching the display mode, operating a menu structure, turning on or off the power, etc.

Command buttons 1308 and 1310, when employed, select one of several different configurations. For example, with continued reference to FIG. 13, Alpha button 1308, when pressed, can select either Alpha1 (e.g. numeric) configuration 1306, or Alpha 2 configuration 1304. Furthermore, PC command button 1310, when pressed, selects PC commands configuration 1302. As illustrated, each of these configurations display different characters, symbols or functions. For example, if the Alpha1 configuration is selected, touching key 1320 will produce the symbol '&' '6' or '\'. Notably, various factors, such as finger and voice detection, will determine which of the three symbols is selected. According to one embodiment, if no finger, voice or other input is provided, a default result will be output. In the previous example, the number '6' can be the default symbol. To select one of the two other symbols, the user may speak either the symbol appellation, or the symbol location on the key, by speaking, for example the words "UP", or "DOWN".

Thus, many characters, numbers and symbols can be selected via the enhanced keypad 1300 without having to add any extra keys. As a further illustration, if a user wishes to select the letter '0,' for example, he or she first selects the Alpha 2 configuration 1304 via command button 1308. Thereafter, the user selects key 1320, which corresponds to the key with the desired symbol. Since this selection is still ambiguous, the user then provides another form of input. This other form of input can be voice recognition, lip recognition, or finger detection etc. For example, the user may pronounce or speak the letter 'O' as he or she presses key 1320 to make that selection. If the user did not provide one of the above-mentioned inputs then the key would default to a particular symbol or function, such as the upward facing arrow function.

It is noted that, according to one embodiment, not every character, function, or symbol is available at the press of one key. For example, rarely used symbols or functions can be assigned to multiple buttons. Illustratively, if the symbol '>' was rarely used, for example, it could be assigned to two keys rather than one. Thus, in order to select the '>' symbol, the user must then simultaneously press the two assigned keys. This is advantageous for those desiring a less cluttered keypad, etc. In addition, using such a technique enables the configuration of an even smaller enhanced keypad.

Notably, enhanced keypad 1300 can be configured according to one of several embodiments. According to one embodiment, as illustrated, all characters from each of the configurations are simultaneously visible on the keypad. When selecting a configuration, the characters corresponding to that configuration illuminate, providing an indication of available characters or symbols to the user. According to another embodiment of the invention, only the characters or symbols corresponding to a selected configuration are shown. Thus, keypad 1300 may have a display similar in appearance to configurations 1302, 1304 or 1306, etc.

It is understood that the various forms of input described above can be combined, according to one embodiment, for added efficiency. For example, enhanced keypad 1300 can detect both voice and lip movement to more quickly isolate the desired symbol. Similarly, lip recognition can be used in conjunction with finger detection (e.g. tip, flat), and so forth.

Lip recognition is particularly useful in public locations with high noise volume. Rather than possibly confusing a voice recognition device, an optical sensor can be provided, such as optical sensor 1428 (FIG. 14) to detect symbols based on the movements of one's lips. It is understood similarly, that according to other embodiments of this invention face recognition can be used as well, wherein facial expressions and characteristics are detected to provide input to the devices described herein. Moreover, face and lip recognition can be used simultaneously, according to one embodiment, for added accuracy. Similarly, all forms of recognition disclosed herein can be used in conjunctions with one or more other forms of recognition to provide enhanced convenience or accuracy.

Figure 13A:
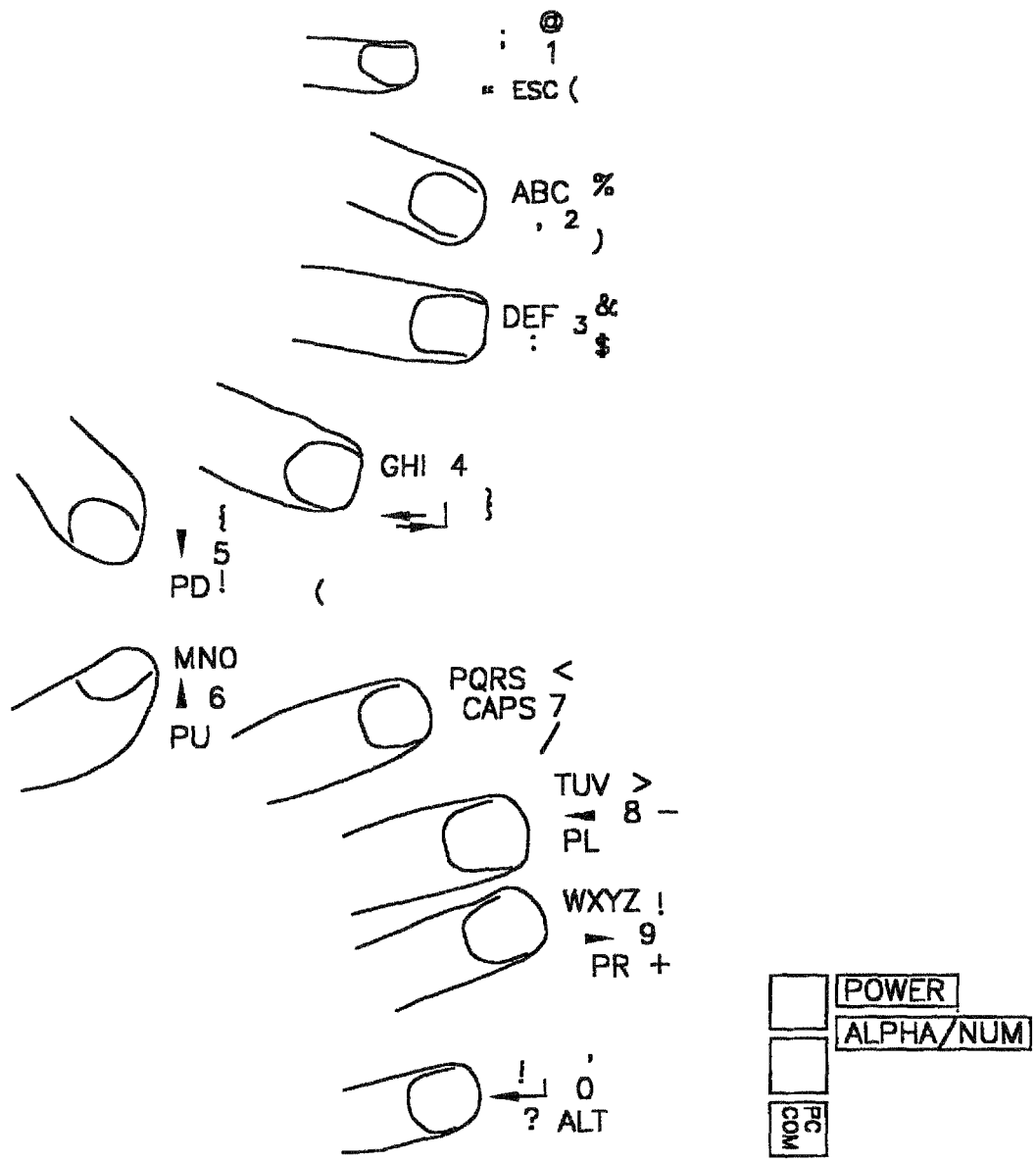
FIG. 13a shows an illustration of the enhanced keypad of FIG. 13 used according to one embodiment of the invention.

With reference to FIG. 13a, the recognition technique described above with reference to FIG. 13 is shown, wherein individual/distinct fingers are assigned to various keys. In this embodiment, character arrangement of the keys 0 to 9, are assigned to 10 different fingers. Different positions of a finger on for example, a sensitive pad, may be assigned to different group of characters. For example, to user's left thumb in upward (tip) position, numeric symbols "{", "6", and "|" are assigned. To the same finger in downward (flat) position, characters "J", "K", "L" and function "<=" are assigned. Still by pressing the pad with, for example, the same finger's nail "PU" command may be selected. To select a character, an additional recognition system, such as voice recognition, may be used. This system may also replace a computer keyboard.

Figure 14:
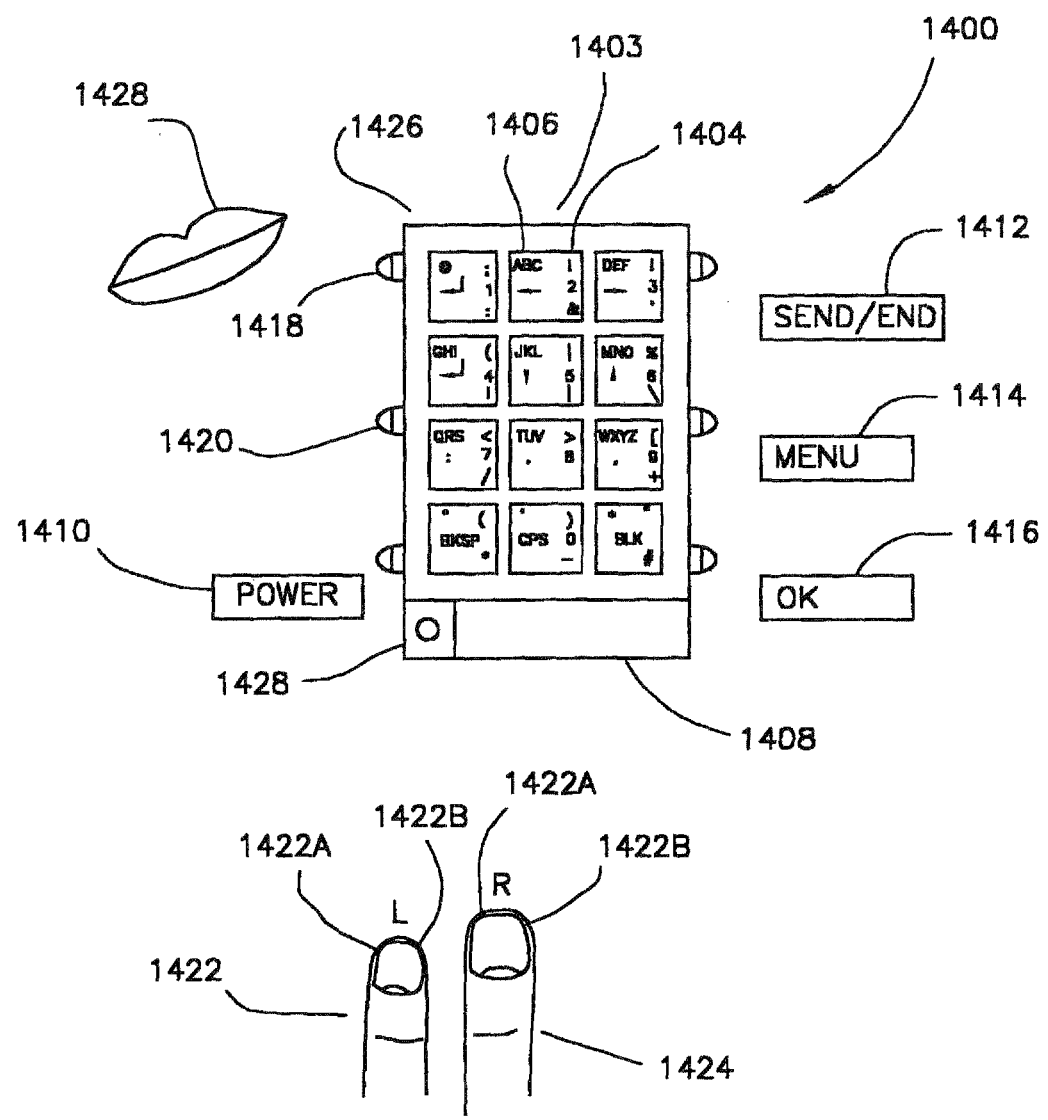
FIG. 14 shows an enhanced keypad according to one embodiment of this invention having lip, voice and other input and recognition means.
Figure 14A:
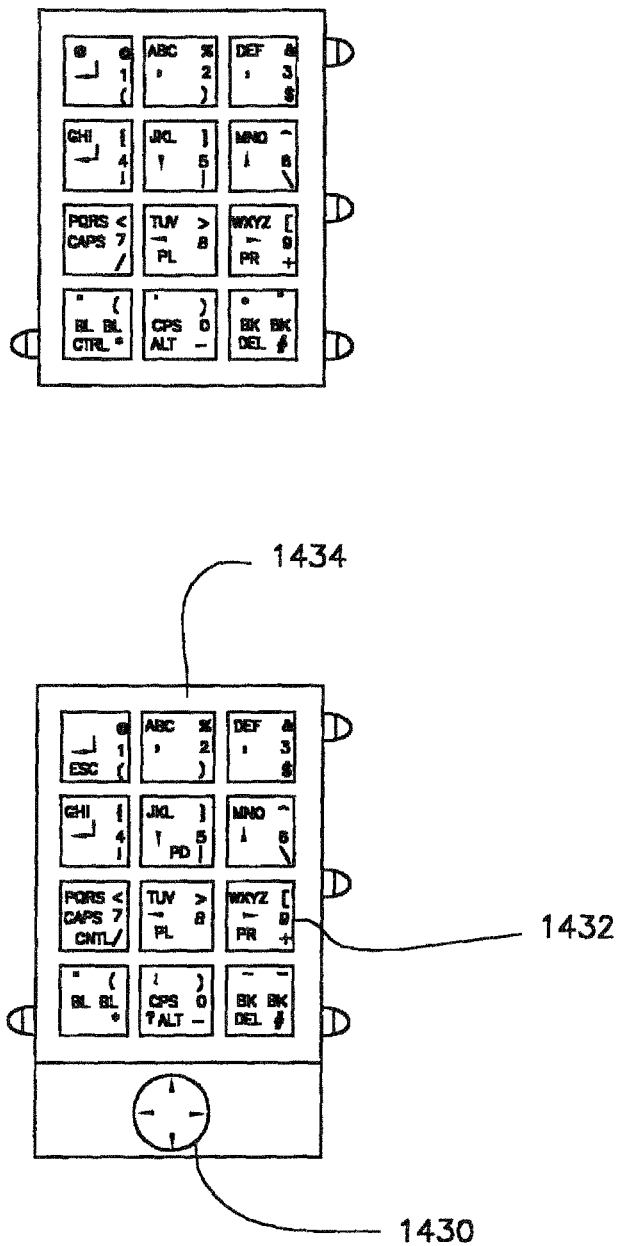
FIG. 14a shows an enhanced keypad according to another embodiment of this invention having lip, voice and other input and recognition means.
Figure 14B:
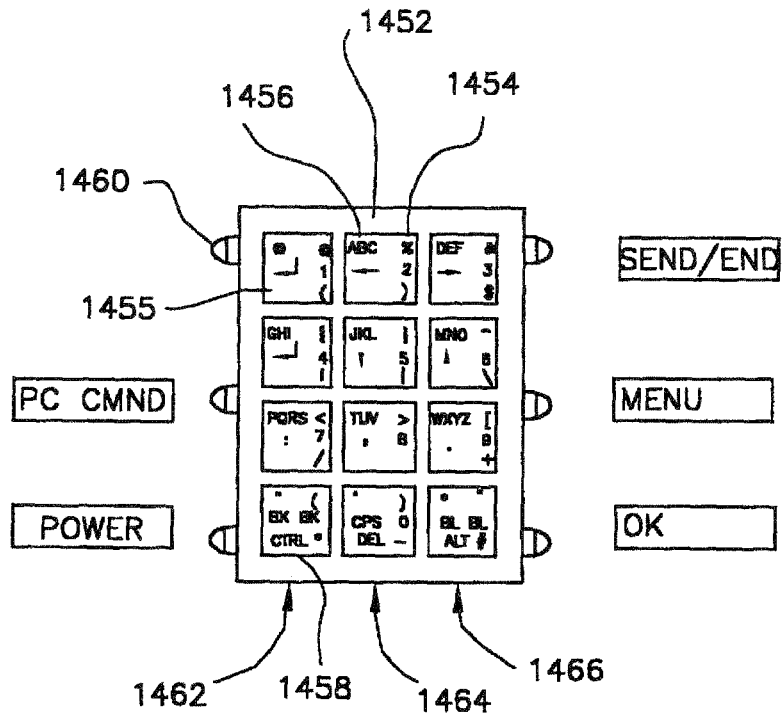
FIG. 14b shows an enhanced keypad according to another embodiment of this invention having lip, voice and other input and recognition means.

With reference to FIG. 14, an enhanced keypad 1400 according to another embodiment of the invention is shown, additionally comprising a finger detection pad 1408, a voice recognition device 1426, and a lip recognition optical device 1428, as described above. According to this embodiment, rather than selecting a configuration via the above-mentioned command buttons, finger recognition is used to select a corresponding configuration. For example, key 1402 displays the Alpha2 and Alpha1 configuration simultaneously on a respective right side 1404 and left side 1406. Fingers 1422 and 1424 can be used, for example, to select from the corresponding configurations. Illustratively, finger 1422 can be assigned to the Alpha 2 configuration (left side 1406) and finger 1424 can be assigned to Alpha 1 configuration (right side 1404). Thus, pressing key 1402 with finger 1424, for example, will select a symbol from the Alpha1 configuration. Thereafter, to resolve the ambiguity between symbols '?' '2' and '&' of key 1402, voice or lip recognition can be provided, as discussed above or will be described later in the embodiment of the FIG. 14b. Alternatively, multiple fingers can be used to resolve the ambiguity via finger detection means. It is understood that any finger or any portion of a finger can be assigned to any of the above-mentioned sides 1404 and 1406. Also, any configuration can be situated on any one of sides 1404 and 1406. According to one embodiment, more than two sides can be incorporated as well. For example, PC commands configuration described above, may be located on the bottom side of the keys as shown in FIGS. 13 and 14*b* (1458). To select a command, the user can, for example, press a button by a finger or a portion of a finger that commands are assigned to. If more than one command is assigned to a key, an additional recognition system such as voice as described above, may be used.

It is understood that the keypad surface maybe covered by a one-piece detecting pad, covering keypad keys, or itself constituting keypad keys. The detecting pad may also be made from a plurality of smaller pads, each pad covering a different key of the keypad or itself constituting a keypad key. It must be noted that the keypad may be constituted from a one-piece sensitive pad, theoretically divided by lines in for example 12 squares, each square being defined as a specific key, according to it location on the keypad.

According to one embodiment, a calibration step, using any of described finger recognition methods, can be used to assign individual fingers, or positions of fingers (e.g. tip, flat) on the pad, to various configurations. This step may involve pressing one, two or more fingers against finger pad 1408, or any one, two or more of the keypad keys, to provide the keypad with data for future detection. It is noted, that according to one embodiment, detecting between two fingers, may be a simple task of isolating the larger or smaller finger, wherein two differently sized fingers are used. This is true for finger portions such as finger's tip and finger flat portions by which the pad is touched. Naturally, alternative embodiments may utilize more sophisticated finger print or finger shape detection means, such as the detection means described above.

According to another embodiment of the invention, finger pad 1408 may be configured as a finger pad input device, similar to the embodiments discussed above. Thus, one may assign characters, symbols or functions to one's fingers and provide input to the system without the need to press the keypad keys (e.g. pointing fingers to keypad keys). Voice and lip recognition can also be employed with the finger pad 1408 to provide added functionality. Similarly, finger pad 1408, in one embodiment, may be excluded from the keypad device 1400 altogether.

With reference to FIG. 14*b*, an enhanced keypad 1450 is shown, according to another embodiment of the invention, configured to operate efficiently with the use of multiple fingers or multiple portions of fingers. Such efficiency is accomplished, according to one embodiment, by placing all letters of the English alphabet on the left side of each key and all Arabic numerals on the right side of each key. Illustratively, key 1452, for example, is configured with a left side 1456 having letters, among other symbols, and a right side 1454, having numbers, among other symbols. It is understood that the system described herein is only an illustration and can be configured according to many formats, such as with upper and lower sides, etc.

Notably, one reason for configuring the device, which according to one embodiment separates numbers and letters, is that users typically don't use both letters and numbers simultaneously when typing. In addition, to limit the passing from one mode to another, some characters frequently used in both modes, may be provided on more than one side (e.g. numeric side and alpha side). For example the symbol "–" is provided in key 1407 in numeric configuration and in key 1409 in alpha configuration. In FIG. 13, character "." Is provided on key 1307 in numeric mode and on key 1309 in alpha mode. Yet for more efficiency, and as shown in FIG. 14*a*, the cursors (e.g. left, right, up,) or other characters, may by provided on separate button 1430, and their place could be occupied by other characters frequently used in both modes. For example, as shown in FIG. 14*a*, character "(", which was assigned to the right side group on button 1434, now can also be assigned to left side group on button 1432, replacing cursor "=>". Key 1430, may be common to all modes.

With continued reference to FIG. 14*b*, an individual is thus able to select any of the displayed letters via one of several fingers. For example, three fingers can be assigned to letter symbols (e.g. alpha mode), wherein each finger corresponds to one of the three vertical rows, as illustrated with rows 1462-1466. A fourth finger, such a pinky for example, can correspond to the numbers (e.g. numeric mode), in all rows. Thus, pressing any of the keys with a pinky would output the corresponding number (e.g. numeric default character). In order to select a non-default numeric character, other input, such as voice or lip recognition, must be provided to make the selection. For example, the user can say with voice, lip, etc. the words "up" 'down', to identify the position of the desired character or function. Similarly, pressing any of the keys with the corresponding alpha mode finger will output an alpha default character such as the center letter, or other default letter. In order to select a non-default letter or character, other input, such as voice or lip recognition, must be provided to make the selection. For example, the user can say with voice, lip, etc. the words "up" 'down' left' or 'right' to identify the position of the desired letter, character or function.

Similarly, according to one embodiment, the user can actually speak the desired letter, character or function, rather than provide its location on the key. In addition, a thumb, or other finger, according to one embodiment can be used to correspond to PC or computer functions also provided to the enhanced keypad. It is understood that, according to one embodiment, only one finger, a portion of a finger or a position of that finger, rather than three fingers, is needed to represent the letters on the input device.

As shown in FIG. 14*b*, alpha configurations are arranged on the left side of the keypad keys (e.g. left side of the key 1452). Keys 2 to 9, usually contain three or four letters that are located on their standard positions on a telephone keypad key (e.g. top 1456). An additional character or function is located on the middle left side of the keys (e.g. middle 1456). To isolate a character, or a function, of alpha configuration situated on a key (e.g. 1454), a user first selects the alpha group of that key, by for example, pressing the key with a finger, or portion of a finger, that alpha mode is assigned to. If he does not combine any other recognition means such as voice, the system will select the default character or function situated on the middle left side of the key (e.g. <=). If the user desires to select one of the letters on the key, he may simply spell that letter.

To other buttons such as 1455, where no letter is assigned to the key, usually three alpha symbols are provided. They are located on top left, middle left and bottom left, on the key. The default may still be the middle left character. It will be selected as described for buttons containing letters. To select on of the other characters or functions, the user may speak for example, the word "UP", for the top left character, or the word "DOWN", for the bottom left one.

Characters and functions in numeric mode are arranged on the right side of the keypad keys. Each key may usually have up to three characters, one in the top right, one in the middle right and one in the bottom right. Numbers from 0 to 9, and other symbols on a standard telephone keypad such as, "*" and "#", may occupy their habitual locations on the keys. They can for example, be placed in the middle right locations on the keys (e.g. 1454). To choose a number or a numeric character, the user first selects the numeric mode with numeric assigned finger as described for alpha mode. If the user does not use any additional recognition means, then the system selects the default character in the middle right position of the key (e.g. "1" on the key 1455). To select the numeric character on the top right or bottom right of the key, the user can use additional recognition means such as voice, by speaking, for example, its location on the key, by using, for example, the words "UP", or "DOWN".

Other functions such as PC commands, may be located on different keys of the keypad, for example, bottom center of the keys (e.g. 1458). To select a command such as a PC command, the user can, for example, press a button by a finger or a portion of a finger that commands are assigned to. If more than one command is assigned to a key, then an additional recognition system as voice such as "UP", "DOWN", can be added to finer recognition system.

The above-mentioned embodiment is a user-friendly system. It has many advantages such as:

The keypad may be of standard telephone-type.

All characters, commands, and functions existing on a computer keyboard maybe available on it.

Letters are situated on their habitual locations on the keypad keys.

Numbers are also located on their standard location on the keypad keys.

For selecting a letter, a user pushes the corresponding key and naturally spells the letter.

For selecting or dialing a number the user simply pushes the corresponding button.

By placing frequently used symbols or functions in numeric or alpha configuration as defaults, user may select them by simply pushing the corresponding button.

For all other numeric and alpha symbols or functions (less frequently used), the user simply pushes the corresponding keys and speaks the words "UP" or "DOWN".

For all commands the user simply pushes the corresponding button.

It is noted, that according to one embodiment, if the recognition device of this invention does not satisfactorily output the desired letter, number or symbol, the user may select a 'backspace' or error notification key. This key may be 'Bk' key 1458 or perhaps an error notification button, such as button 1460, for example. Thereafter, the input device will provide an alternative selection, which may or may not correspond to the originally intended selection, wherein the user may again select the 'backspace' key, and so forth. According to one embodiment, the 'backspace' key simply removes the previous selection without providing an alternative selection. Rather, the input device may, according to one embodiment, remember the previous selection so that the same error will not be repeated. According to one embodiment of the invention, a spelling checker can be provided to enhance the detection based on the correct spelling of a typed word, etc. For example, if a user is typing a word and the detection device is having difficulty identifying one of the corresponding letters, the letter which completes a correctly spelled word will be chosen according to one embodiment. For this purpose the system may contain a database of words and functions of one or more languages in its memory.

Figure 14C:
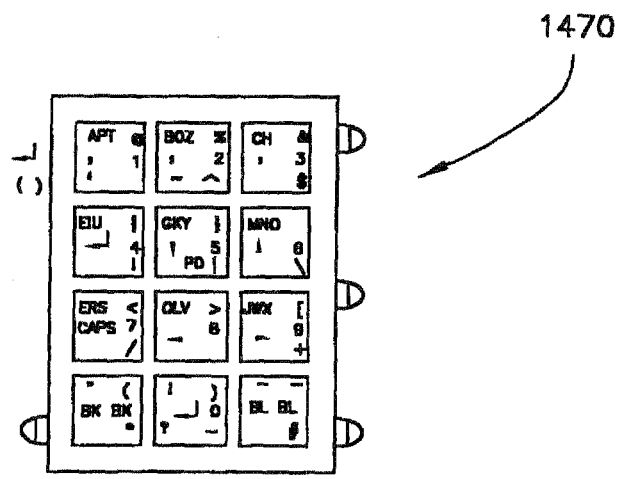
FIG. 14c shows an enhanced keypad according to another embodiment of this invention having lip, voice and other input and recognition means.

With reference to FIG. 14*c*, an enhanced keypad 1470 is shown, according to another embodiment of the invention. Keypad 1470 displays an arrangement of letters that are positioned in a non-alphabetic order. Keypad 1470 is organized as such in order to enhance the effectiveness of the lip, voice, or other recognition techniques of this invention. Specifically, the letters that are most easily distinguishable via such recognition techniques are kept together on the same key. Similarly, the letters that are hard to distinguish are placed on separate keys. This reduces potentially frequent error between two letters that are most difficult for the input device to distinguish. It is understood, that enhanced keypad 1470 displays only one of many possible arrangements, and others can be configured based on the distinguishableness of characters. It is noted that, according to one embodiment, to tones or tone translations provided by phone keys can still be maintained even though the letters are arranged differently. According to one embodiment, whenever a letter is detected the tone corresponding to the key traditionally associated with that letter is provided. This provides backward compatibility with other phone devices and systems.

Figure 14D:
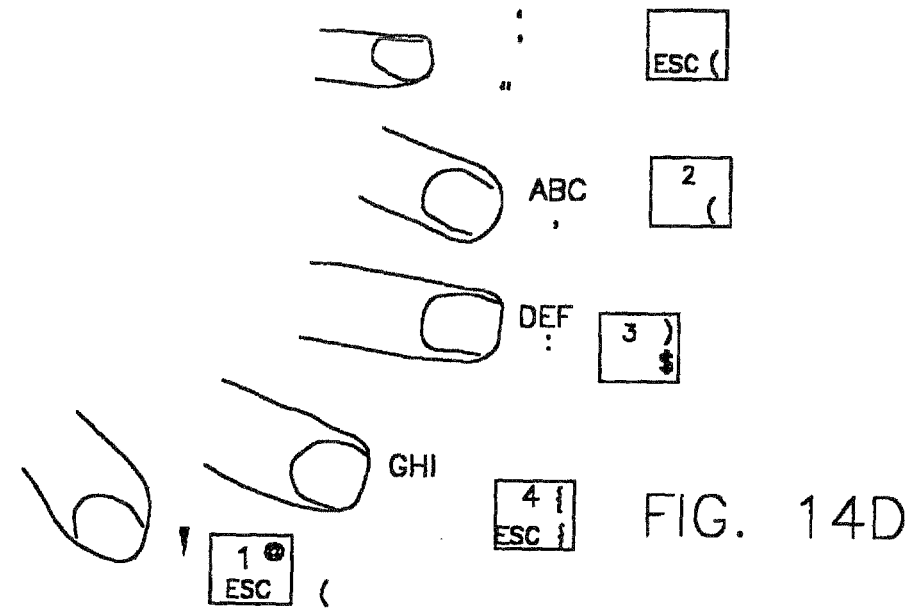
FIG. 14d shows an arrangement of keys for structuring an enhanced keypad, according to one embodiment of this invention, utilizing the recognition technique of FIG. 14b.
Figure 14E:
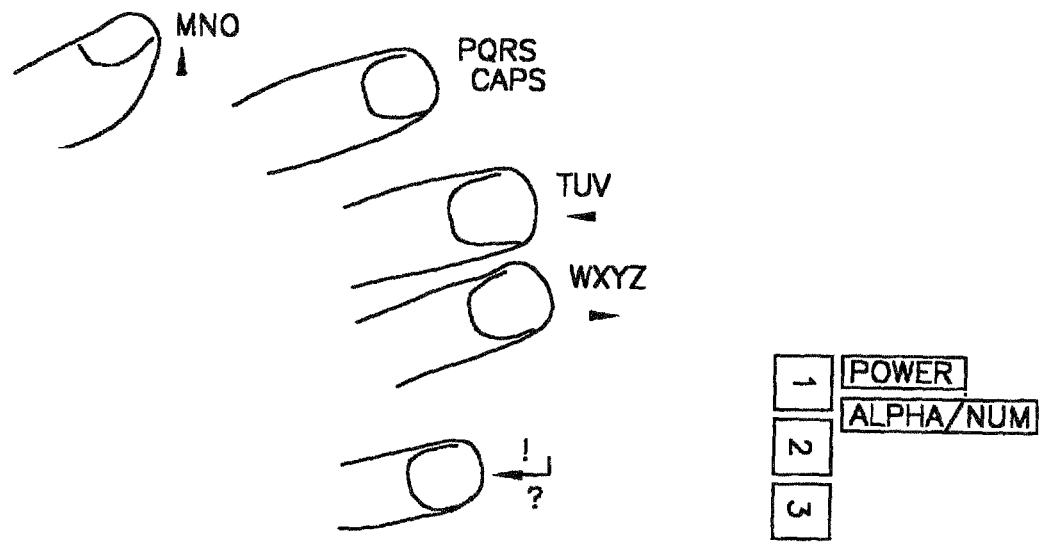
FIG. 14e shows an arrangement of keys for structuring an enhanced keypad, according to one embodiment of this invention, utilizing the recognition technique of FIG. 14b.
Figure 15:
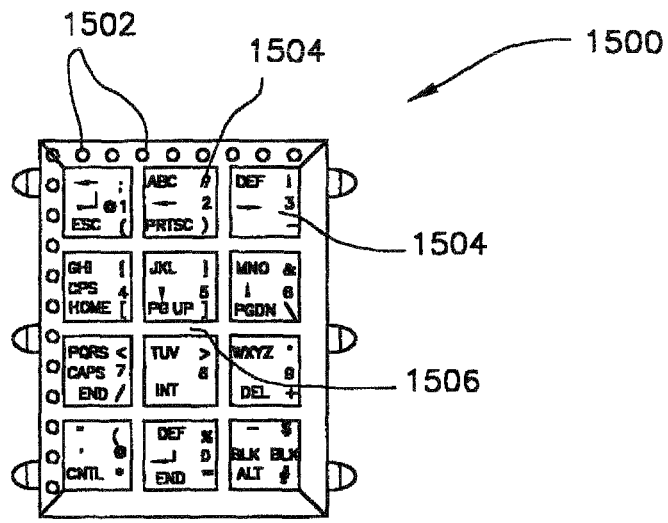
FIG. 15 shows an enhanced keypad according to one embodiment of this invention, comprising light sensors and pressure sensing means.

With reference to FIGS. 14*d* and 14*e* respective hand and horizontal arrangements of keys are respectively shown, similar to the arrangements described with reference to FIGS. 15*b* and 15*c*. FIGS. 14*b* and 14*c* illustrate, according to one embodiment, the alpha groups assigned to fingers, and numeric groups to assigned to buttons. The buttons are differently arranged in FIGS. 14*d* and 14*e*.

According to another embodiment of this invention, enhanced keypad device can alternatively be provided with light sensors or pressure sensing means for finger detection, among other things. Illustratively, with reference to FIG. 15, enhanced keypad 1500 is shown, having light sensors 1502 and pressure sensing means 1504. It is understood, that in another embodiment of this invention the light sensor and pressure sensing means can operate distinctly without the presence of the other or in conjunction for more efficient detection. Furthermore, it is also understood that light and pressure sensing means of this embodiment can be configured to operate with other devices, such as the detection and input devices described above, in addition to the enhanced keypad 1500 of FIG. 15. It is noted that using such detection means a pad is not necessary according to one embodiment of the invention. Individuals can use optical, light, laser or other detection means, for example, to detect finger or other movements in the air without a pad of surface, etc.

Light sensors 1502 operate by employing detection in two ways. First, the sensors detect the location of the finger on the keypad, and second they determine the particular size and/or shape of the finger being used. The location of the finger is determined based on intersecting X and Y coordinates of the bi-directional light sensing rays. For example, light sensors can be projected both horizontally and vertically. The horizontal and vertical rays that sense a blocking object, such as a finger, are activated. Thus, the location of the finger is the same location where the activated horizontal and vertical light sensors intersect on the two dimensional pad of the keypad.

The size and/or shape of the particular finger being used is determined based on the number of activated light sensors. A wider or larger finger will naturally activate more sensors, wherein the light sensors are configured with sufficient sensitivity or resolution. Thus, based on a size or shape determination, the particular finger used can be isolated. Once the location and precise finger is identified, such a keypad or input device can operate in a similar fashion to one of the embodiments described above.

Pressure sensing means 1504 are also able to detect the location of the finger and the particular type of finger used. The location is determined based on the pressure mechanism. Namely, the location with the sensed pressure is the location where the finger is pressing. Moreover, a very sensitive pressure sensing device can also determine the precise size of a finger based on the precise area that the pressure is sensed. Similar to the light sensor, differently sized fingers can be detected in such a fashion. Notably, such very sensitive pressure sensing devices are available in the art. For example, U.S. Pat. No. 5,952,585 to Trantzas et al, titled Portable Pressure Sensing Apparatus . . . describes such a device and is hereby incorporated by reference into this application. Such system can operate in a similar fashion to one of the embodiments described above. It is understood that pressure sensing pad and light sensing means can be used in conjunction, first system determining the location of the finger to determine, for example, the key presses, and second system measuring the finger size, to determine which finger was used.

It is noted that according to one embodiment of the invention, the above described light and pressure sensing means can be configured to operate with other forms of input or detection as well. For example, voice or lip detection can be incorporated for added functionality or accuracy.

According to one embodiment of the invention, the devices utilizing the above described light sensors and/or pressure sensing means are configured without keys, buttons, or similar input signal tools. Indeed, with continued reference to FIG. 15, a recessed pad 1506 is shown, having no keys or buttons on the center input section. Rather, images or displays of commands, if any, are displayed on a flat surface. The configuration of this embodiment provides for several advantages. Specifically, with a flat and/or smooth surface the recessed pad 1506 can be configured for additional uses. For example, such a device can be configured to operate both as an input device for a portable wrist watch phone as well as a latch. Illustratively, when the phone is not in use, the flat area of pad 1506 can incorporate a locking or latch mechanism to seal the wrist watch phone around one's wrist. Thus, the pad can become deactivated and hidden from view. Furthermore, the light sensors or pressure sensing means can automatically activate when the latch is released and the phone is removed from the user's wrist for normal use. In particular, since the light sensors operate a distance above pad 1506, the recessed area is ideal for such a latch or locking mechanism.

Figure 18:
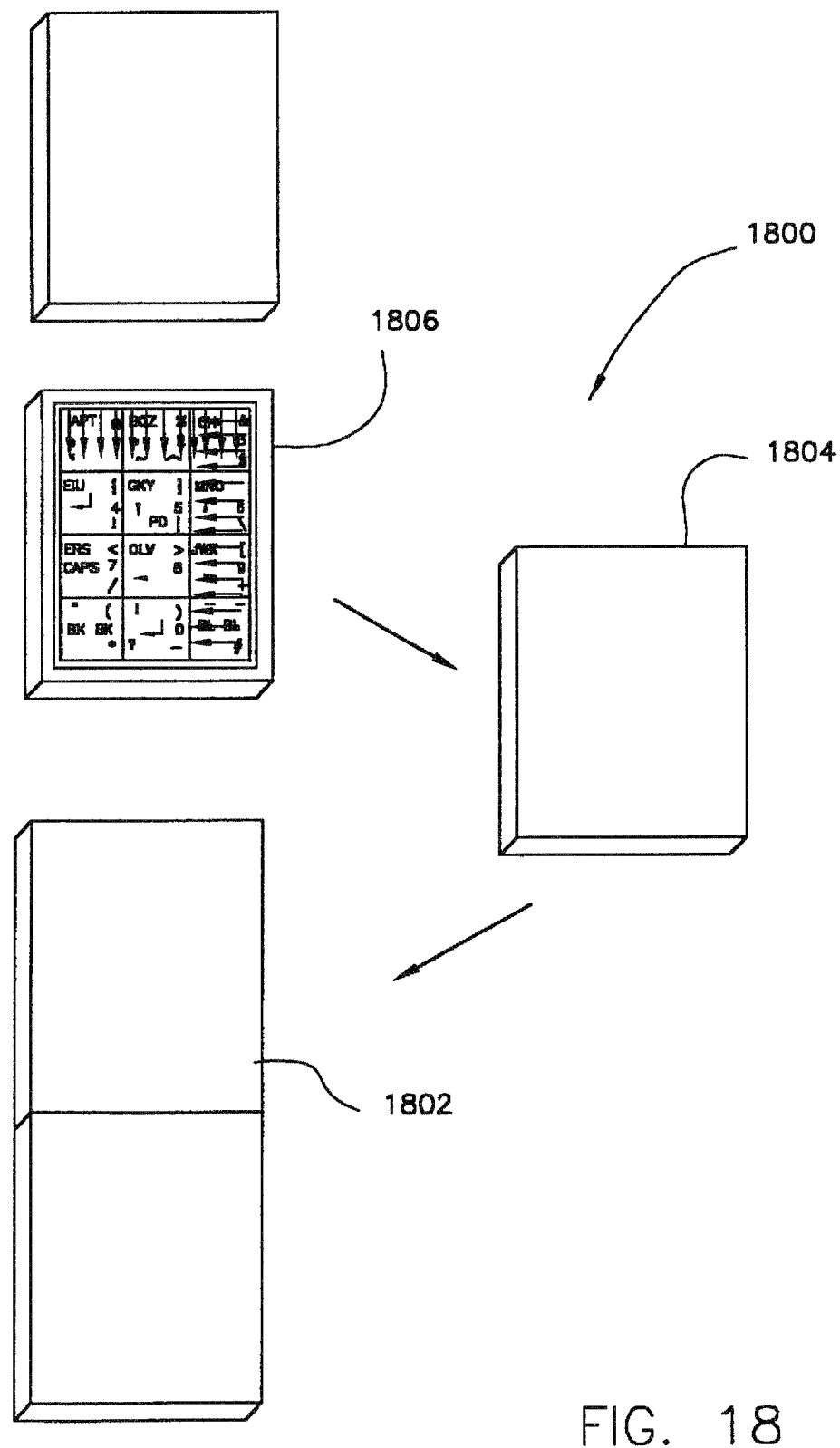
FIG. 18 shows a wrist watch phone and PDA, according to one embodiment of this invention, comprising a recessed enhanced keypad with locking mechanism.

With reference to FIG. 18, the above described wrist watch phone/PDA, 1800 with enhanced keypad 1806 is illustrated according to one embodiment of the invention. Briefly, the phone has a removable portion 1804 that latches or connects with recessed enhanced keypad 1806 as described above. When disconnected, handset phone 1804 can be opened to handset 1802 for use as a phone with keypad 1806, etc.

It is understood that the input and recognition devices described herein can be configured with a variety of tools and/or surfaces. For example, according to one embodiment, an input device can be provided with keys, while according to another a touch sensitive display screen is utilized, etc. Similarly, any recognition device can be incorporated, including camera and optical detection, laser detection, and rayon detection. Notably, regardless of the surface, according to one embodiment each of the keys or surface locations can be customized by the user to correspond to different functions, letters, symbols, etc. Should the surface be of a technology that cannot dynamically display the user changes, an overlay can be provided to provide via paper or other material a key imagery that corresponds to the user customization.

Figure 15B:
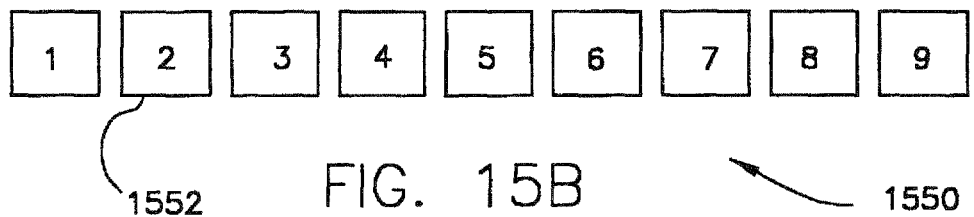
FIG. 15b shows an arrangement of keys for structuring an enhanced keypad, according to one embodiment of this invention.
Figure 15C:
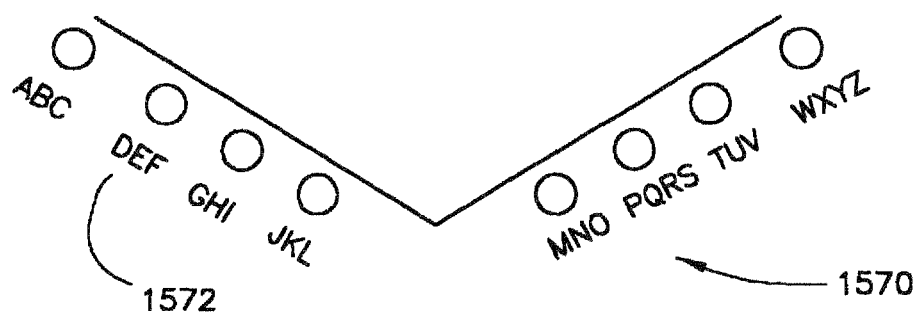
FIG. 15c shows an arrangement of keys for structuring an enhanced keypad, according to one embodiment of this invention.

With reference to FIG. 15b, an enhanced keypad 1550 is shown, according to another embodiment of this invention, having a vertical arrangement of keys, such as key 1552. Keypad 1550 is configured to operate similar in function to the above-mentioned devices, such as keypad 1500 and keypad 1450. Rather than being structured according to a standard keypad structure, however, keypad 1550 is arranged vertically. It is thus understood that, according to other embodiments of the invention, various arrangements are possible, other than the typical rectangular structure of a traditional keypad. Similarly, with reference to FIG. 15c an angled keypad 1570 is shown, arranged so that both hands of a user can more easily rest on the keys, such as key 1572. As detailed above, these embodiment may also comprise other input surfaces and devices, such as a smooth finger pad surface, in addition to the keys of this embodiment.

Figure 29A:
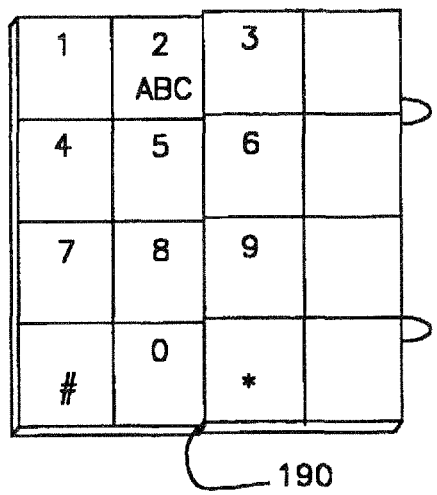
FIG. 29a shows an enhanced multi-sectioned keypad according to one embodiment of the invention.
Figure 29B:
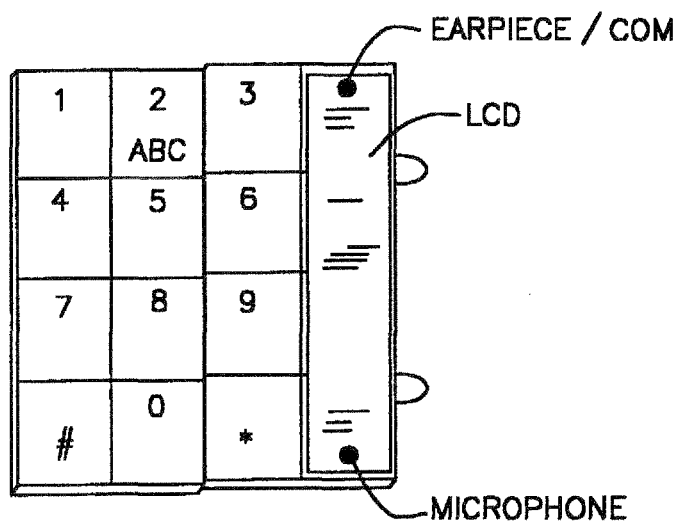
FIG. 29b shows an enhanced multi-sectioned keypad having a LCD according to one embodiment of the invention.
Figure 29C:
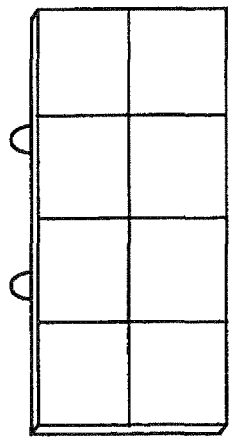
FIG. 29c shows an enhanced multi-sectioned keypad in closed position according to one embodiment of the invention.

Referring to FIGS. 29a, 29b, and 29c, a multi-section keypad using technologies described before, is shown. In the closed position (see FIG. 29c), this device minimizes the size of the keypad. It is understood that the sections may be connected to each other by any means as described for the FIGS. 16-17. This keypad may contain other features as LCD display, ear-piece, microphone, camera, etc. (FIG. 29b), as described for the FIGS. 20 to 22. In this example the keypad is made of two sections, one section containing two rows of four keys each, and the other containing one row of four keys. This keypad can be used for devices such as wrist-mounted phones or wrist mounted PDA devices.

As previously mentioned, characters, functions, symbols, or combination of them can be assigned to scanned portions, positions, or motions of one or more fingers. For example, to two different positions or portions of a finger on a sensitive pad, two group of one or more characters, functions, or symbols can be assigned. The scanning system can be made by thermal, pressure, optical, or any other recognition means.

This method can be used for selecting different group of characters in the enhanced keypad 1400. According to another embodiment of the invention, instead of using different fingers to select different configurations, different portions of a finger can be used to select different configurations. For example, tip portion 1422a of finger 1422 can be assigned to one certain function and the flat portion 1422b of finger 1422 can be assigned to a different function. Furthermore, the keys or the buttons of the keypad are configured such that various portions of the user's fingers can be detected. Thus, a user can select the alpha configuration by pressing one of the buttons or keys of the keypad with the tip portion 1422a and, likewise the user can select the numeric configuration, with the flat portion 1422b of the same finger.

This system will allow more flexibility and can multiply the assignment possibilities for a user. For example, by pressing a key of the keypad with flat portion 1422b of finger 1422, a user can select the alpha configuration. He can also select the numeric configuration by pressing a key of the keypad by tip portion 1422a of the same finger 1422 or another tip portion of another finger, for example 1424. The commands could be selected for example by pressing a button by the thumb, a portion of a finger or both of them.

According to one preferred embodiment of the invention, as mentioned before, by combining keys of a keypad, finger recognition systems, voice/speech recognition systems and arrangements of characters, symbols and functions (hereafter symbols) on the keys of the keypad (e.g. telephone keypad), a user can achieve to isolate one of those symbols by pressing on, or pointing to, a button only one time. As explained in more detail hereinafter, other isolating means as a click system for the keypad keys can be added to above-mentioned combinations.

It is understood that in some embodiments, selecting a symbol may not require all of the above-mentioned character/function selection means—such as voice or finger position or finger shape or fingerprint—but only some or even one of them. For example the combination of above-mentioned means of selecting a symbol may be different for each keypad or a key of a keypad. Thus, for different keypads different arrangements of symbols on the keys may be provided. As such, a key may contain only one or two symbols requiring, for example, one of the selection means to select the desired symbol.

As mentioned before, in the embodiments that employ voice or speech recognition, for choosing a letter, the user pushes a button with the finger or a portion a finger that alpha characters are assigned to, and in the same time he only has to speak the letter desired by him. For all other symbols in alpha configuration he may not have to speak. A symbol shall be selected by default by only pressing the key without speaking. In the numeric configuration the user usually has three possibilities per key. If he does not use his voice the default symbol will automatically be selected. For other numeric symbols on the key, he can use his voice to say for example "up", or "down" or any other voice signal he desires (these voice signals and combinations of assignments to different fingerprints could previously been taught to the machine by one or more users). Preferably, numbers or other numeric symbols used frequently may be used as default choices. In this case the user will rarely use his voice to select a numeric symbol.

The above embodiment permits the user to easily, quickly and naturally enter texts and functions through the telephone keypad.

In still another embodiment of the invention, the keys of the keypad are made from click sensitive pads. A click sensitive pad is configured to respond to two levels of finger pressure. A light pressure generates one response and a heavier pressure generates another response while indicating to the user by means of a click. The click system can be combined with any other recognition system and specially with the ones described before. For example in FIG. 14, a click can be combined with the finger recognition system to select a configuration. A user can select the alpha configuration by pressing slightly a key with the finger 1422, and using numeric configuration by pushing a key more strongly with the same or another finger and thus causing a click.

Figure 27A:
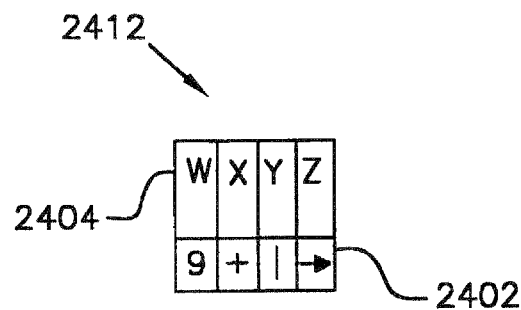
FIG. 27a shows a key of an enhanced keypad using click sensitive pad according to one embodiment of the invention.
Figure 27B:
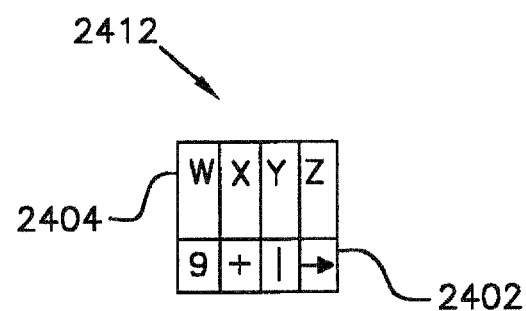
FIG. 27b shows a key of an enhanced keypad using click sensitive pad according to one embodiment of the invention.

The above-mentioned system is also useful to make selection of symbols without using a user's voice. A group of symbols are available on a key. A user can assign to each finger a number of those symbols. A specific motion of a finger on the key or the portion of the finger by which the key is pressed, may select the symbol desired by a user. For example in FIG. 27a, eight different symbols are arranged on this key. They are arranged in two rows and four columns. The letters are arranged in the upper row 2404 and a group of other symbols in the lower row 2402. Four different fingers of a user can be assigned to these four different columns, one for each. By pressing the button, for example by a finger, the respective column 2412 is selected. If the user presses the button with the flat portion of the finger in downward position (e.g. flat portion), the letter "X" is selected. He can select "+", by pressing the key by tip portion of his finger.

Instead of finger portion by which the button is pressed, a click system can be added to the key. In this case, for example after a user selects a column 2412 by a corresponding finger, he can push it with his finger in any position or portion. He can select the letter "X", by pressing the button slightly. If he desires to select the "+" symbol, he must press the button with more pressure to click the button.

Figure 28:
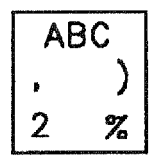
FIG. 28 shows a key of an enhanced keypad using click sensitive pad according to one embodiment of the invention.

In still another embodiment of the invention, FIG. 28, a group of symbols are assigned to each key of a keypad. In order to select a desired symbol through this embodiment, different recognition systems such as speech/voice recognition systems and finger recognition systems can be combined with, for example, a touch sensitive keypad having a click system under each button.

To ease the user's input of the symbols of a key, they may be arranged in different rows on that key. In the example of FIG. 28, the symbols are arranged in three rows. Upper row comprises, for example, the letters "ABC". To choose a letter from this row the user has to push the button with a finger and simultaneously spelling the desired letter.

A middle row contains, for example, two symbols. For choosing one of those symbols different methods can be used. Left side symbol can be assigned to the tip portion of a finger and the right side to the tip portion of another finger both touches without clicking the button. Voice inputs as "left" or "right" can also be used to select one of the symbols combined with the pressing of the button by any finger in, for example, upward (e.g. tip) position.

Lower row comprises two more characters. To select a symbol of this row, the user may use the same system as the second row but with adding a click of the button by pushing it stronger. It is appreciated to those skilled in the art that many variations of the combinations of the selection means can be employed without departing from the present invention.

With reference to FIG. 14, when a button 1403 is pressed with the alpha assigned finger, and a letter is spoken, the voice or speech recognition system will try to understand which one of the only three letters "A" or "B" or "C" was pronounced. Because the system employs recognition of only three letter sounds, different users can use the same system without voice training requirements.

Thus, many of the benefits of the present invention can be employed to provide an improved keypad system that is versatile, compact and user friendly. As mentioned before, using a finger recognition system for entering symbols through the telephone-type keypad or selecting a configuration of symbols (e.g. alpha, numeric, function), a user can use his fingerprints or finger characteristics according to at least the following principles separately or combined;

- At least one configuration of symbols, such as a set of alpha characters or a set of numeric characters or a set of commands, can be assigned to at least one finger or a combination of fingers.
- At least one configuration of symbols can be assigned to at least a portion, or at least a motion of one finger.

According to above-mentioned principles, a user at his convenience, can use for example:

- Only one finger to select different configurations, for example by pressing a key by different portion of a finger (e.g. pressing a key with the tip portion of the finger or with the flat portion of a finger).
- One or more fingers, each individually, selecting a different configuration. For example a forefinger for alpha configuration, a thumb for PC commands configuration and a pinky for numeric configuration.
- One or more fingers, each individually, selecting the same configuration. For example a user can use his three middle fingers for alpha configuration, while he uses his thumb for PC commands configuration and his pinky for numeric configuration.
- At least one finger to select at least one configuration. For example to select the command symbol "ctrl" a user can press the button by his thumb, and to select the command symbol "pr" he may press simultaneously the "ctrl" button by his thumb and "pr" button by his forefinger.

It is understood that the fingerprint recognition usage can be applied to the fingers of both hands. In addition, voice, lip and other recognition systems may be combined with finger recognition systems mentioned above.

As mentioned before, for speaking silently, for example the letters, a microphone could be arranged in front of the user's mouth. Another solution is to provide a commercially available microphone in user's ear permitting to input his voice through vibration of his ear bone.

The above mentioned systems of input may be integrated in many devices such as mobile and fix telephones, PDAs, computers, laptops, remote controllers of TVs or other electronic devices, faxes, etc. In addition, independent input devices according to systems described before may be manufactured separately and be used as external input devices for above mentioned products.

The system may include one or more databases of words in different languages. A predictive word recognition system may also be combined with the system to make the entry of a word possible before entering it entirely. This system may allow an automatic selection of the desired word by the machine, mostly before ending to enter it entirely even without the need of the user interference. This is possible, because by selecting individually a character or a symbol through this system (e.g. character by character), and the very small numbers of selection of corresponding words for keys pressed, it will be easy to determine the desired word before finishing to enter it entirely.

Even if the user enters a wrong letter of a word or the machine fails to identify a given letter, since in most cases other letters of the word are entered correctly, the predictive word recognition system can automatically correct the wrong letter.

It is understood that instead of speaking a letter the user can speak a word while pressing the corresponding buttons. In this case the databases mentioned before will be used to select the desired letter by a word recognition system. The end of a word can be determined by many symbols or functions such as ".", ";", space, enter command, etc.

It is also understood that the sensitive keypad can be made either from one pad which is combined with all the keys, or a plurality of separate smaller pads combined with each key (e.g. twelve separate pads for twelve keys of a keypad).

According to yet another embodiment of the invention, one or more of the above-mentioned devices, such as finger pad detection device 800 or enhanced keypad 1400, can be configured to operate with a miniature display screen or communication/computer card. Such a screen or card could comprise a flexible plastic LCD or similar device for the display. It is understood, of course, that the above mentioned input devices can be employed to operate with other devices, in addition to the miniature display screen or communication/computer card described herein. For example, enhanced keypad 1400 can be configured as part of a wrist watch phone, a computer, a PDA device, etc. It is also understood that such LCD may also be used for any device that needs to have an LCD, such as mobile phones. The communication between them may be wireless.

Figure 16:
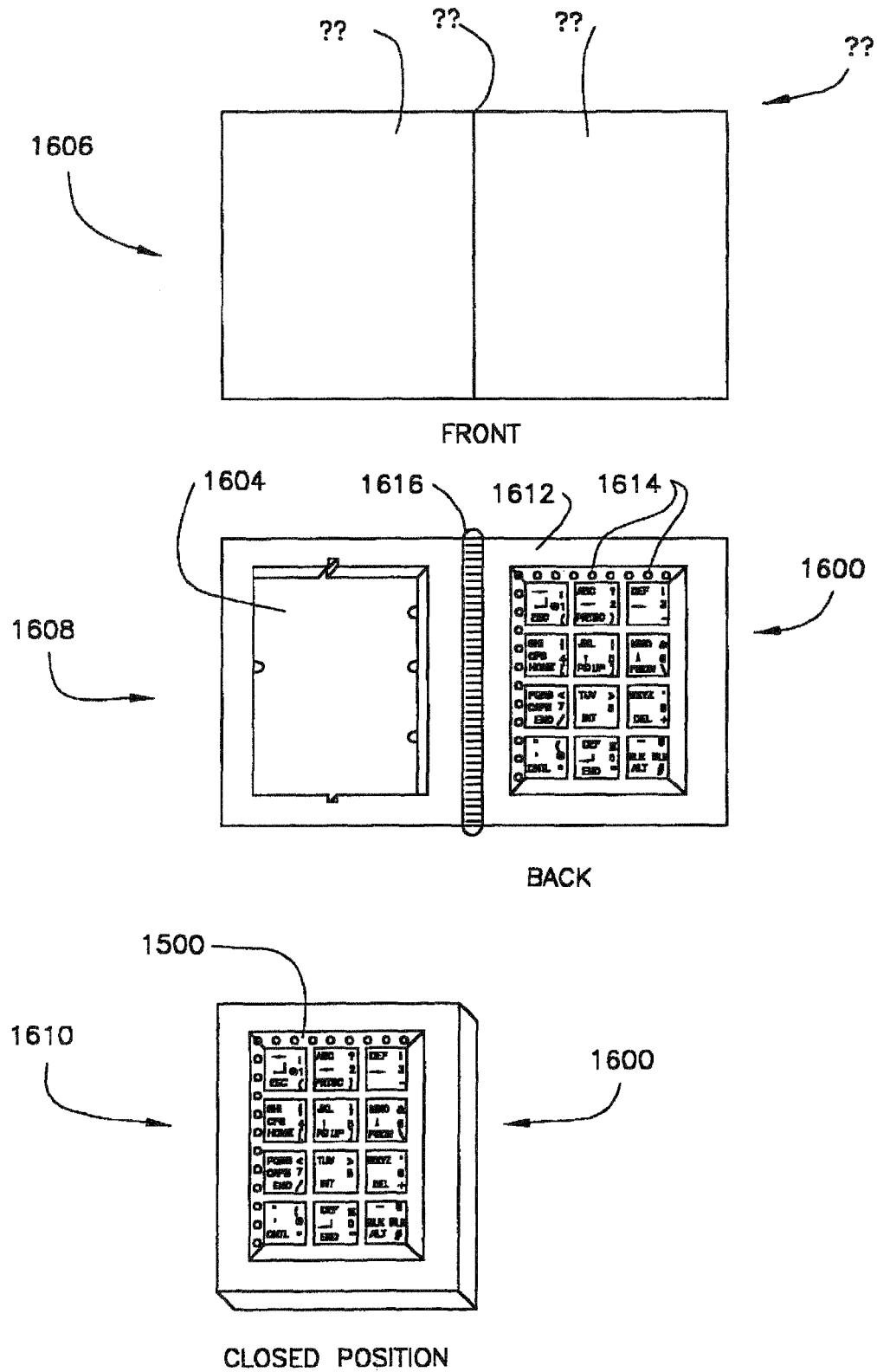
FIG. 16 shows a multi-sectioned LCD comprising an enhanced keypad according to one embodiment of this invention.

With reference to FIG. 16, a multi sectioned LCD pad is shown 1600, according to one embodiment of this invention, comprising a front LCD portion 1602, a rear memory slot portion 1604 for extra memory of battery power, and a rear enhanced keypad portion 1612. It is noted that there other components not shown in the drawings, such as interior hardware, that are additional components of LCD pad 1600.

Furthermore, multi sectioned LCD pad 1600 comprises a hinge portion 1616 for folding, the pad in half to the size of a credit card, for example. It is noted that, according to another embodiment, LCD pad can be extended outward and inward rather than folded, etc. Notably, according to one embodiment, the entire hinge portion of binge 1616 is situated on the rear portion of pad 1600 so that the front LCD portion 1602 appears flat for enhanced image visibility, etc. With continued reference to FIG. 16, the front portion of LCD pad 1600 is shown as image 1606, the rear or back portion is shown as image 1608, and the closed or folded portion of LCD pad 1600 is shown as image 1610.

According to one embodiment, rear enhanced keypad portion 1612 operates in the same manner as keypad 1500 (FIG. 15). For example light sensor means can be provided for input and finger detection, such as light sensor means 1614. Moreover, it is understood that enhanced keypad 1612 can be attached to the front portion of multi sectioned LCD pad 1600 as well, such that both the LCD and enhanced keypad can be more easily viewed and used together. According to such an embodiment, the rear portion can remain unused, such that when folded the LCD pad 1600 can slip into one's wallet or pocket similar to a credit card or miniature device. The interior sealed portion would comprise the LCD and enhanced keypad.

According to one embodiment of the invention, LCD pad 1600 can operate as a PDA, a wrist watch PDA, a computer, an interactive newspaper, etc. Illustratively, LCD pad 1600 can be attached to (or telecommunicate with) a miniature computer device for an added LCD display screen, as well as added input means via enhanced keypad 1612, for example. Alternatively, the card may be employed as a PDA for use while simultaneously positioned on one's wrist as a watch.

Alternatively, the card may be employed as a functional LCD display to add on to telephones, cellular phones or other devices, such that interaction with the device via the LCD pad is possible. For example, when dialing a computer automated system via a phone, LCD pad 1600 can be configured to display any computer menus or other automated selections on the LCD. This avoids the hassle of pressing numerous phone keys in order to get the desired selection or location. Moreover, LCD pad 1600 can provide added voice messaging and other computerized features to a phone or other communication device.

Briefly, FIGS. 16a-16e show various embodiments of the above described LCD device and enhanced keypad. Various multi-sectioned LCDs and keypad configurations are displayed, according to one of the several embodiments of this invention.

Figure 16A:
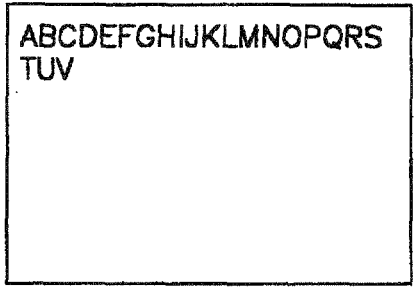
FIG. 16a shows an LCD device, sized as a credit card, according to one embodiment of this invention.
Figure 16B:
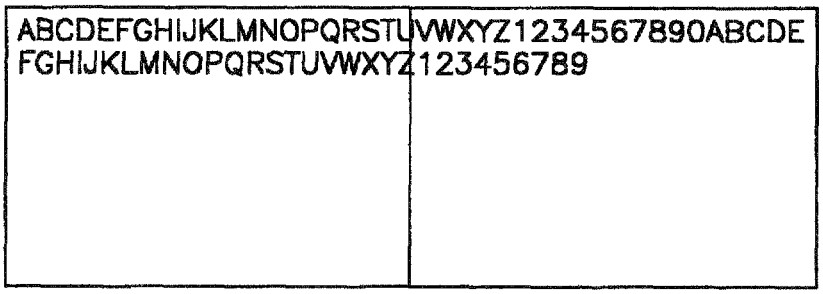
FIG. 16b shows a multi-sectioned LCD according to one embodiment of this invention.
Figure 16C:
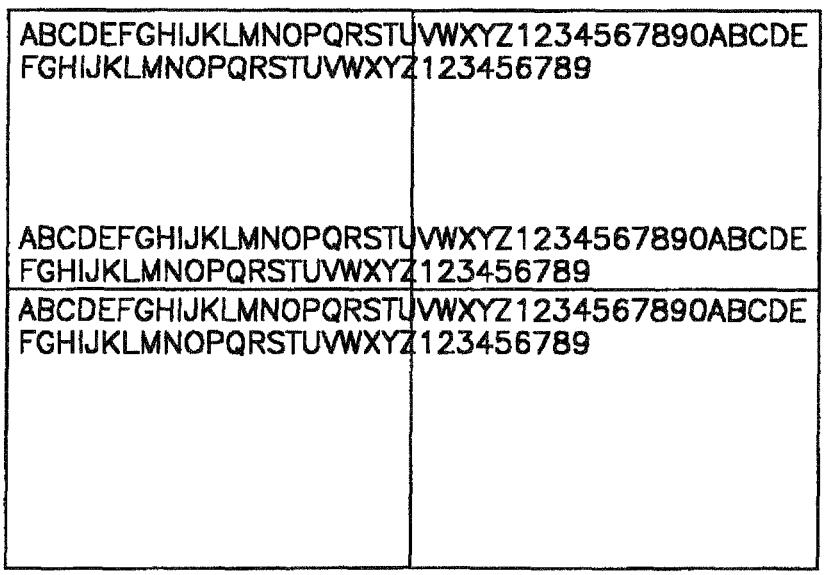
FIG. 16c shows a multi-sectioned LCD according to one embodiment of this invention.

It is understood that LCD device of FIG. 16a may be used as an external display for mobile electronics and telecommunication devices with no LCD or having a miniaturized one. In this case a person having, for example, a wrist telephone on his wrist, may carry an additional credit card size LCD in his pocket. The credit card size LCD can be used, for example, for displaying short messages entered by the user's phone keypad. The credit card size LCD can be multi sectioned. When opened or unfolded, the LCD width of FIG. 16b or 16c, can almost be the same width of a standard A4/A5 paper, permitting the user to work on a real size document. It should be noted that the connection between telecommunication device and the external LCD may be wired or wireless by any means.

In yet another embodiment external LCDs may be available in many places, such as offices or restaurants. Carriers of, for example, mobile phones with LCD size limitations, can use this available external LCDs found everywhere. In one embodiment, the user may enter a secret code, known by his phone, in the external LCD to permit communications between that LCD and his phone. After usage the user decodes the external LCD. This system limits the communication to only desired LCD and avoids the connection with other LCDs available nearby.

Figure 16D:
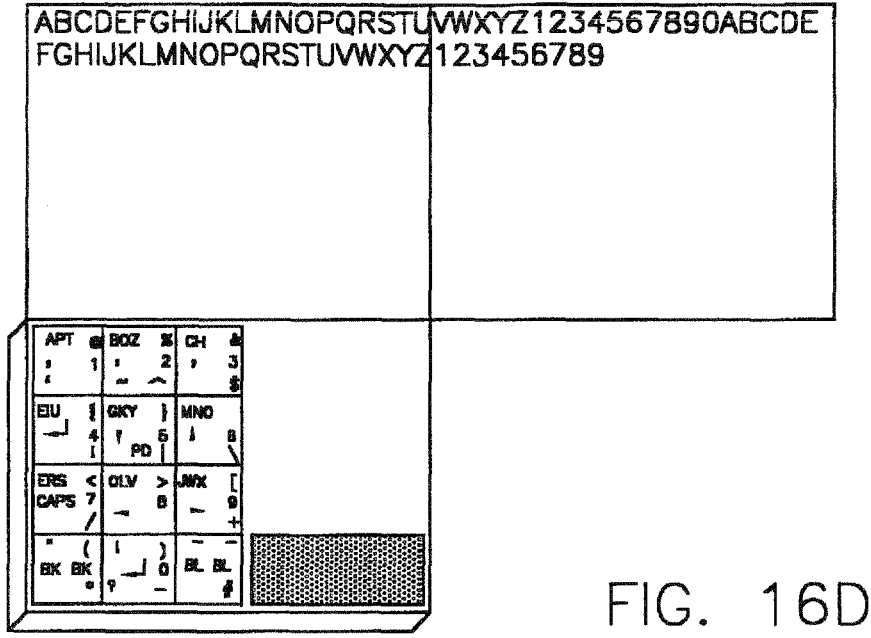
FIG. 16d shows a multi-sectioned LCD comprising an enhanced keypad according to one embodiment of this invention.

FIG. 16d, illustrates an external multi-sectioned interface, comprising an enhanced input device as discussed in connection with the previously-described embodiments, and a multi-sectioned credit card size LCD. The credit card size LCD may be detachable and wirelessly connected to the keypad.

Figure 16E:
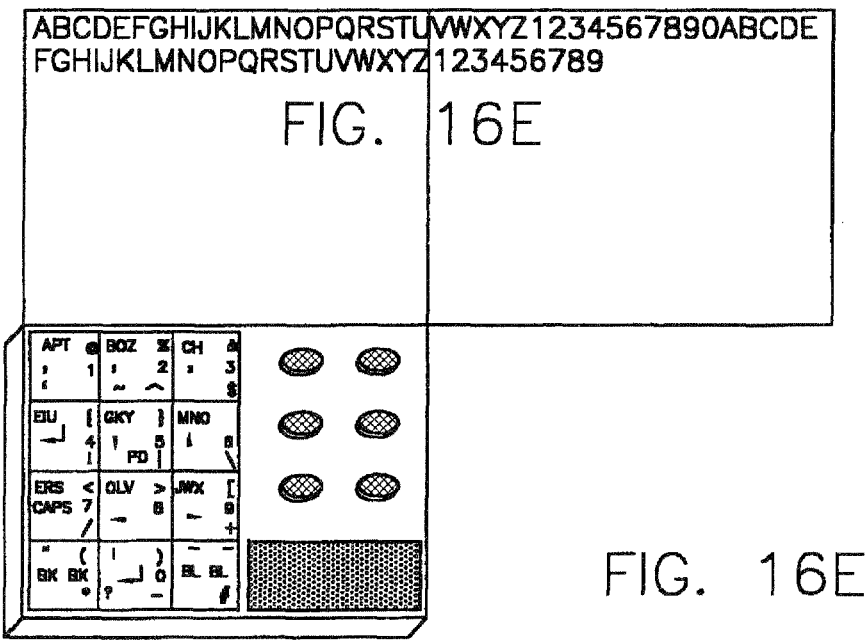
FIG. 16e shows a credit size computer having a multi-sectioned LCD and enhanced keypad according to one embodiment of this invention.

FIG. 16e, illustrates a credit card size computer, comprising an enhanced input device as described in embodiments before, memory (not shown), battery and other features (not shown), and a multi sectioned credit card size LCD. The credit card size LCD may be detachable and wirelessly connected to the computer. It should be noted that components that computer, such as battery, memory, etc., may also be credit cad size and may be detachable.

Figure 16G:
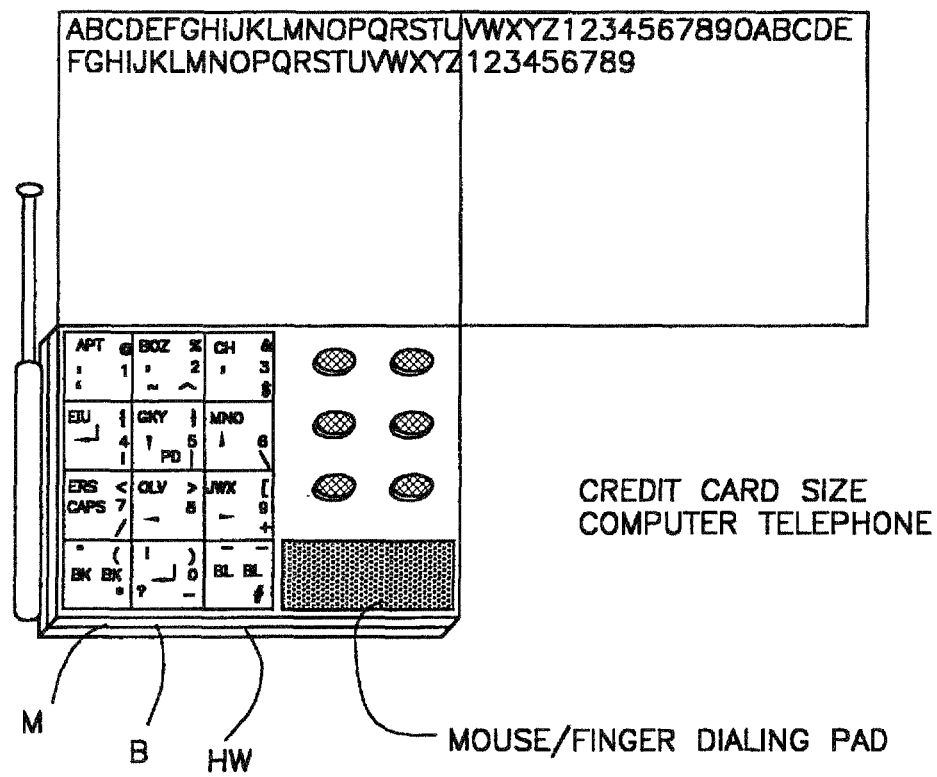
FIG. 16g shows an a credit card size computer and telecommunication device according to one embodiment of the invention.

FIG. 16g, illustrates a credit card size computer and telecommunication device, comprising an enhanced input device as described in embodiments before, memory (not shown), battery and other features (not shown), and a multi sectioned credit card size LCD. The credit card size LCD may be detachable and wirelessly connected to the computer.

Figure 17:
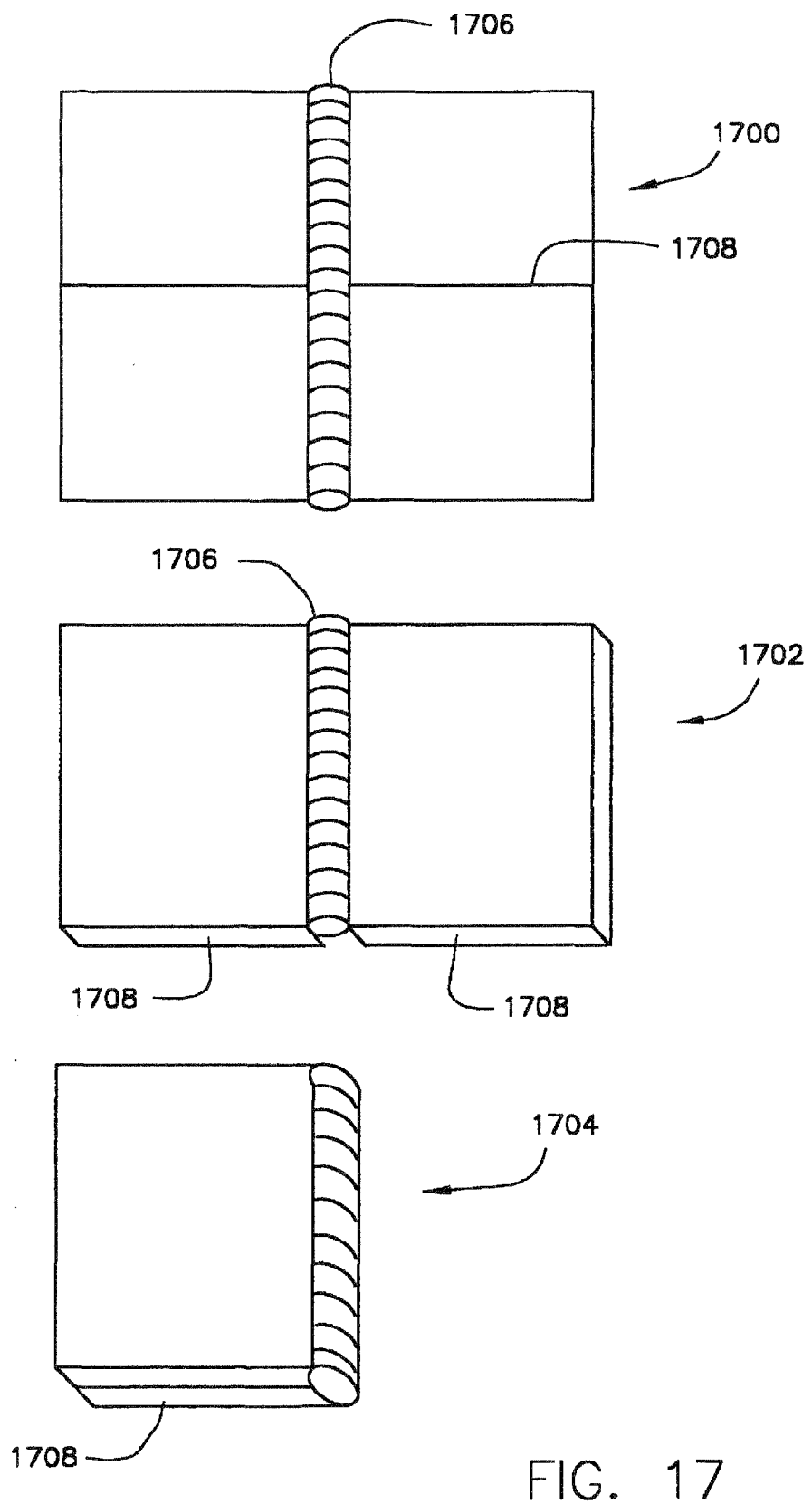
FIG. 17 shows a large LCD panel having multiple hinges for increased folding or miniaturization.

With reference to FIG. 17, a large LCD panel 1700 is shown, according to one embodiment of the invention. LCD panel 1700 comprises a front LCD portion 1708 shown on front view 1700 and a rear portion for optional input devices or other components (not shown). It is understood that such input device can be situated on the front portion as well, as discussed above. According to one embodiment of the invention, LCD panel 1700 is comprised of plastic and of flexible material for added convenience and agility.

Large LCD panel 1700 can be folded to approximately a forth of its size via folding hinges 1706 and 1708. Notably, view 1702 illustrates large LCD panel 1700 in a half-folded view. Furthermore, view 1704 illustrates LCD panel 1700 in a fully folded view. It is understood that large LCD panel 1700 can be configured with more or less hinge mechanisms to further increase or decrease the size and compactness of the device.

According to one embodiment of the invention, LCD panel 1700 can be configured to operate as a digital newspaper. Thus, individuals can use LCD panel 1700 to download digitized news from one or more news sources and thereafter read the news or other desired information. Such a device is advantageous since news can be continuously updated throughout the day and the format and content of the news can be customized by the user.

For example, one user may program the LCD panel 1700 to only download sports news from three particular sources. Another user can only view local news, and so forth. It is understood that LCD panel 1700 can display information in addition to the information traditionally provided by newspapers. Indeed, a digital environment provides means for features that are unavailable with the traditional newspaper format. According to one embodiment of the invention, the above-described downloading, uploading and updating is accomplished via the Internet. Similarly, according to one embodiment, any of the devices described herein can be configured to upload or download data via the Internet.

According to one embodiment, LCD panel 1700 is provided to users at various download stations. Rather than waiting a possibly extended period to download the desired news. Kiosks, or similar sites, can be introduced, wherein individuals pick up and drop off their LCD panel devices for faster downloading. Such locations can have bandwidth or other technology not available to the average user. According to one embodiment, such LCD panel device can be the property of a news corporation, wherein individuals borrow or rent the devices for digital news. Such embodiments enable the majority of downloading to occur at the Kiosk and minimal, non-intensive downloading can occur through other means, such as wireless technology, to update the news, if needed, while the LCD panel is in the user's possession.

This system and method has many advantages. Kiosks may permanently be updated with the last versions of any news agency's information and other publications. A user may possess a card (hereafter "Newscard"). The LCD device, (hereafter "Newslcd"), can be borrowed from a kiosk using Newscard. It may be returned to that kiosk or any other kiosk as well. Newscard will be updated to show that its owner has a Newslcd with him. The user can ask the kiosk owner to provide him with a copy of any publication he desires. Since the publication is only required to be locally copied, the procedure will be practically instantaneous.

For payment, the user either uses his Newscard or another payment system. If the user uses his Newscard, he may receive a monthly statement for all publications he has purchased during that period. If the user does not want to carry the Newslcd permanently, he simply can deposit it in the nearest kiosk and his Newslcd will be updated accordingly, showing that he does not possess a Newslcd. The Newslcd may contain a floppy disk accommodation, permitting the user to remove the diskette containing his publications. At any moment the usr can access to another kiosk to borrow another Newslcd. It must be noted that the diskette maybe of any kind and it could be the property of any party. Newslcd, may be a large flexible, for example plastic, LCD. It may comprise a reduced keypad for functions such as "next page", or zoom.

According to one embodiment, the large LCD panel can be designed without hinges, such that no folding is possible. Such a device may comprise plastic LCD technology, as mentioned above, for added flexibility.

It is noted that, according to one embodiment of the invention, large LCD pad 1700 can also be a fully operational computer or similar device. For example, the LCD display portion can operate both as a display screen and as an input device. Notably, the input device of FIG. 11a, as describe above, can be configured to operate jointly as an input device and a display screen. Alternatively, input means can be provided on another portion of large LCD pad 1700. Furthermore, computer components, such as storage and processor means can be installed in compact form as provided by state of the art technology.

Figure 19:
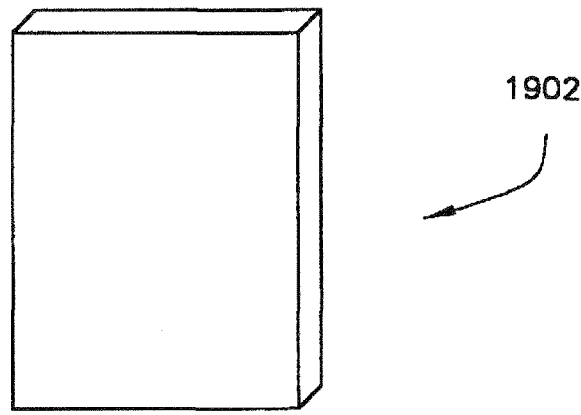
FIG. 19 shows an enhanced keypad device according to one embodiment of this invention, having two keypads.
Figure 19:
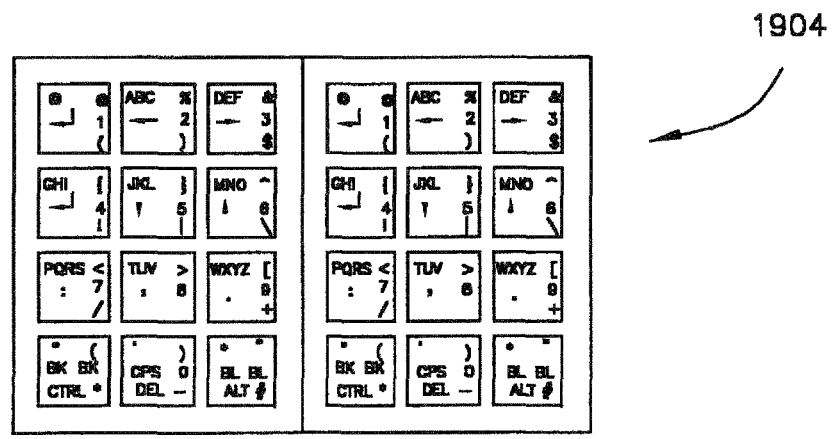
Figure 19:
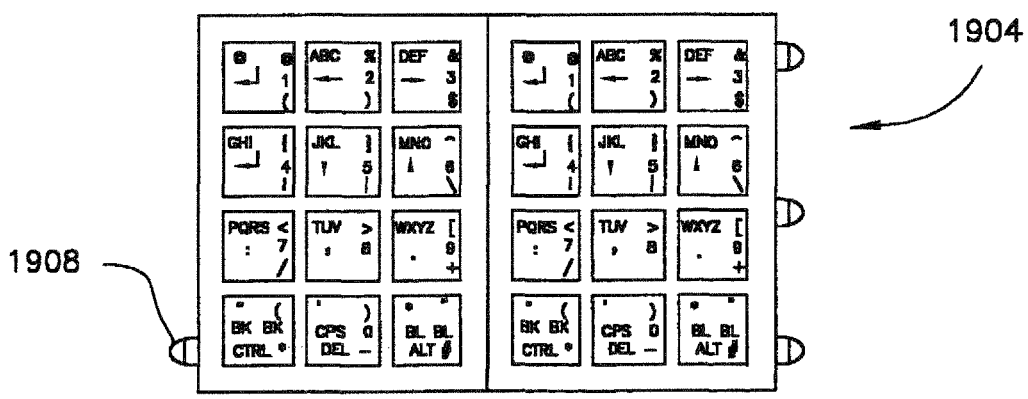

With reference to FIG. 19, an enhanced keypad device 1904 according to yet another embodiment of the invention is shown, having two keypads. Rather than combining multiple configurations on one keypad, such as with the keypad device of FIG. 13, here two keypads are provided so that both a numeric configuration and a character configuration can be employed simultaneously. It is understood, of course, that keypad device 1904 can be provided with any two configurations as well.

With continued reference to FIG. 19, keypad 1902 is shown in a closed position, illustrating how the keypad device of this embodiment can fold in half when not in use. According to one embodiment of this invention, keypad 1904 can be provided with button controls, such as button control 1908, for added functionality, as described in the embodiments above. Furthermore, other features, such as voice detection, lip detection, and hand detection, can be added to keypad 1904, as described with the embodiments above.

Figure 20:
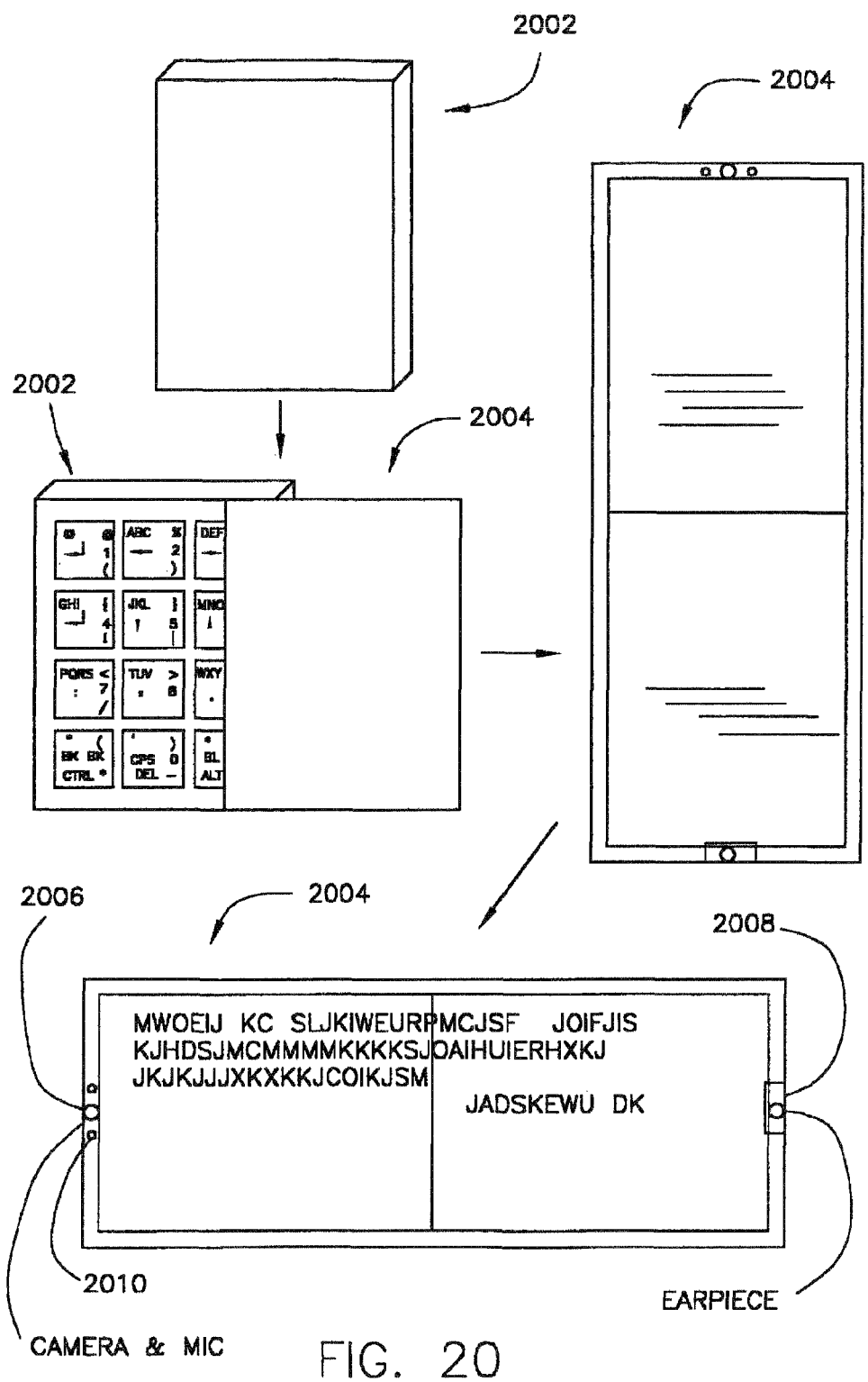
FIG. 20 shows an enhanced keypad device according to one embodiment of this invention, having a removable handset that includes a display pad.

With reference to FIG. 20, an enhanced keypad device 2002 is shown having a removable handset 2004 that includes a display pad, according to yet another embodiment of this invention. Keypad device 2002, shown initially in closed position, is configured so that the handset display pad 2004 can be removed for active use. Thus, according to one embodiment of the invention, keypad device 2002 can be configured to operate with a phone or other portable communication device. The keypad portion can be used for input, such as for dialing a phonenumber or typing characters. The display pad in the handset can be used as an output display, to view input entries or to read data from external sources, such as the Internet or other individuals.

According to one embodiment, display pad 2004 can be configured to operate interchangeably with different keypad devices. Thus, individuals can swap display pads among different keypad devices for convenience, functionality, etc. It is noted that display pad 2004, according to one embodiment of this invention, can be provided with a security or bar code device in order to prevent the display pad from being attached to other keypad devices without proper authorization. Moreover, the display pad can have a menu display in order to provide a selection of such functionality to the user.

Keypad device 2002 or display screen 2004 can also be provided with a camera 2006, microphone 2010, and earpiece 2008, in order to employ the recognition methods described above. According to one embodiment of the invention, for example, voice recognition can be employed. Illustratively, one type of voice recognition may operate while the user is typing characters or words into the keypad device and simultaneously speaking those words to be interpreted via voice recognition. The accuracy of the recognition is improved since the user is also typing all or part of the words being spoken. According to one embodiment, a space or period key, or any other symbol, can be added to the keypad to signal the start of a new word. It is also understood, that the voice recognition described above can be employed via lip, face, or other forms of recognition as well. Thus, according to one embodiment, a user can use lip recognition to pronounce entire words as well.

Figure 21:
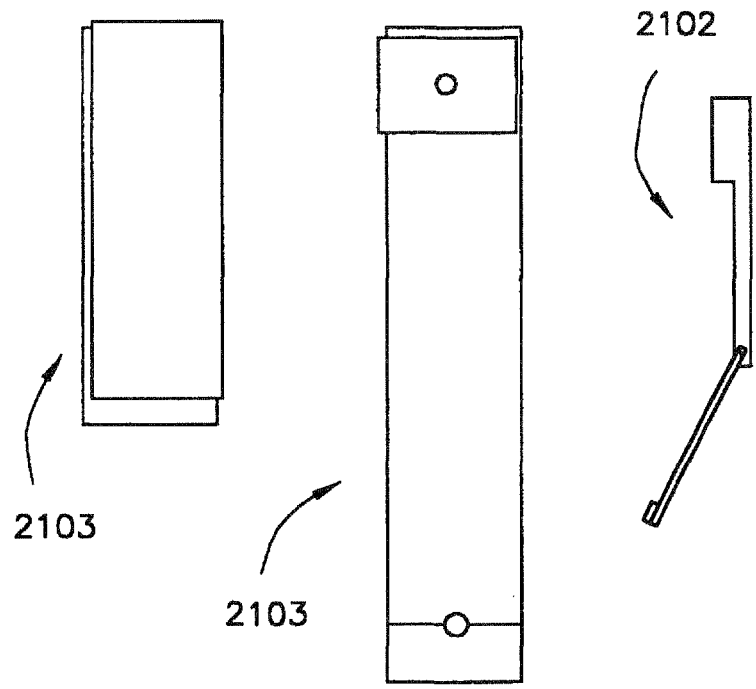
FIG. 21 shows a handset device according to one embodiment of this invention, having a display pad on the rear portion of the handset.
Figure 21:
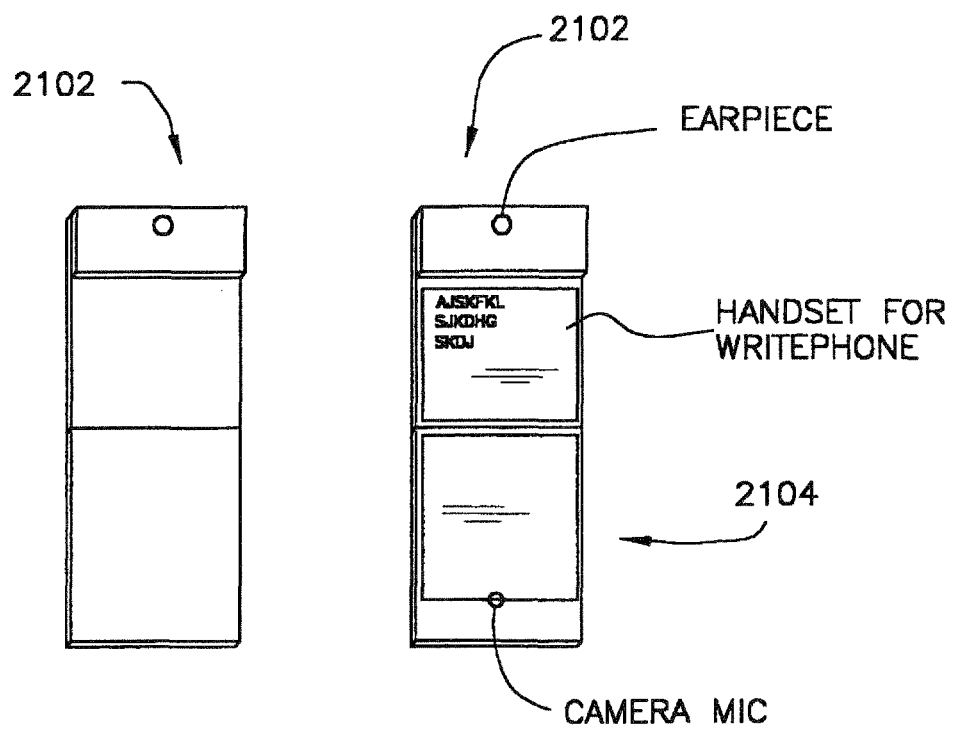

With reference to FIG. 21, a handset 2102 having a built in display screen 2104 is shown, according to one embodiment of the invention. As shown, handset 2102 may be folded for portability. In addition, a display pad 2104 is provided on the rear side of the handset, along with other needed components, such as an earpiece, camera, and microphone, etc.

Figure 22:
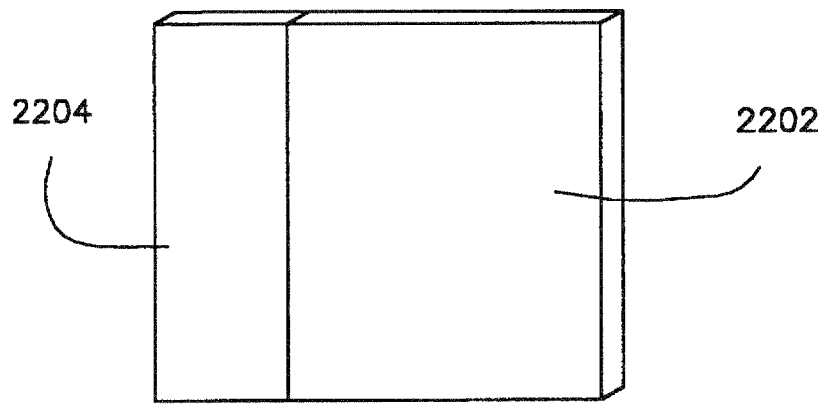
FIG. 22 shows a handset device according to one embodiment of this invention, configured to detachably connect to the enhanced keypad device of FIG. 20.
Figure 22:
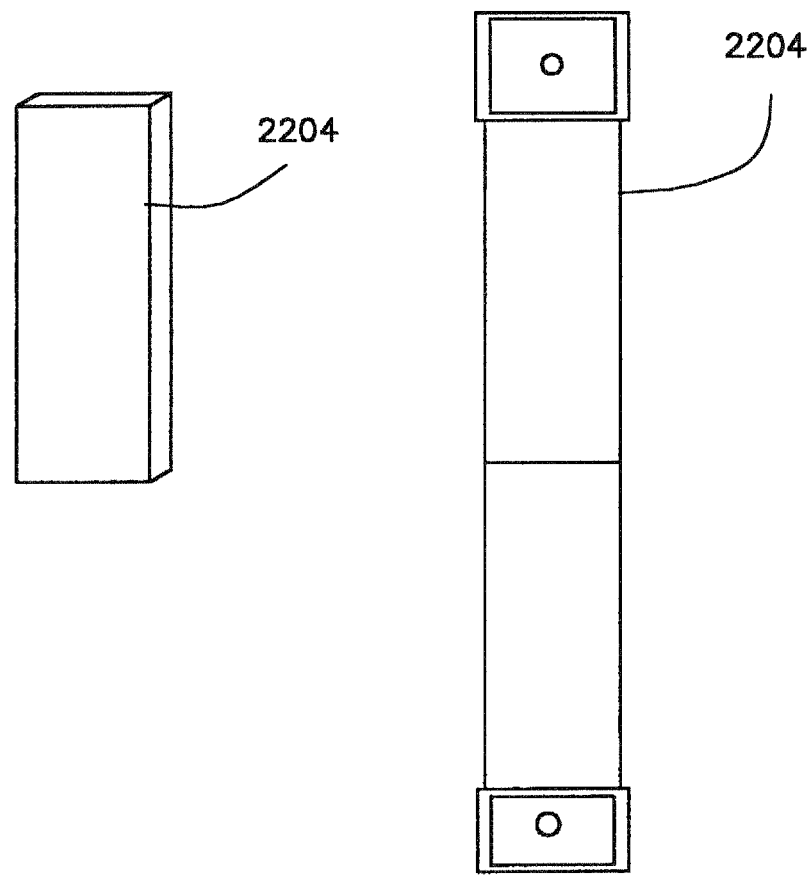
Figure 23:
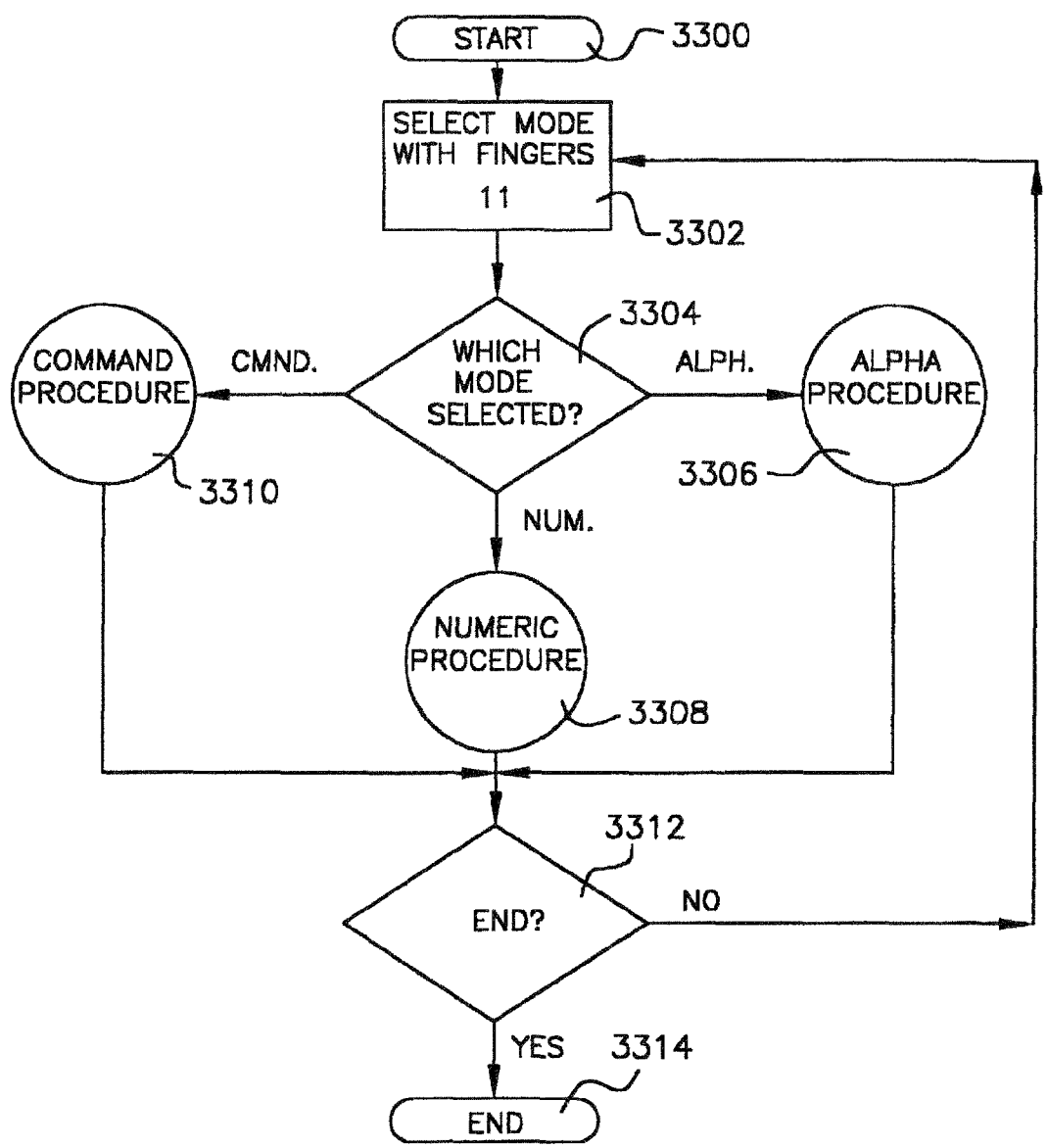
FIG. 23 shows a flowchart concerning the general steps of character, symbol and function recognition system according to preferred embodiment.

FIG. 22 shows a handset device 2204 similar to that of FIG. 21, but without a display screen. Rather, the keypad device 2202 and display screen of FIG. 20 is shown attached to the handset device, according to one embodiment of the invention. Thus, the user can utilize a handset, phone, keypad, and/or display screen in one device, wherein each of these components can be separated for individual use.

FIGS. 23 through 26 illustrates the steps that are employed to operate a keypad in connection with one embodiment of the invention. An enhanced keypad is illustrated in FIG. 14b, where a user can employ to operate all the functions provided by the system. Thus at step 3300 a user begins the operation on the keypad by selecting the mode of operation at step 3302. It is noted that the system is pre-configured to assign one or more user fingers to a corresponding mode of operation. For example, in one embodiment of the invention, the system may assign the thumb to the "control" mode operation. The pinky may be assigned to numeric mode operation. Any one or all of the middle three fingers may be assigned to the alphabet mode operation. Therefore in reference with FIG. 14b, if the pinky finger is pressed, the system assigns the functionality of the characters that are located on the right portion of each button. Similarly, if the thumb finger is pressed the system assigns the functionality of the "control" characters that are located on the middle bottom portion of each button, and if any of the middle three fingers are pressed the system assigns the functionality of the alphabet characters. It is noted that the invention is not limited in scope to this embodiment and any form of finger assignment may be employed to differentiate the desired modes of the operation. For example, the flat portion of a user's thumb may be assigned to a command configuration. The flat portion of any other finger may be assigned to an alpha configuration and the tip portion of any finger may be assigned to a numeric configuration.

Figure 24:
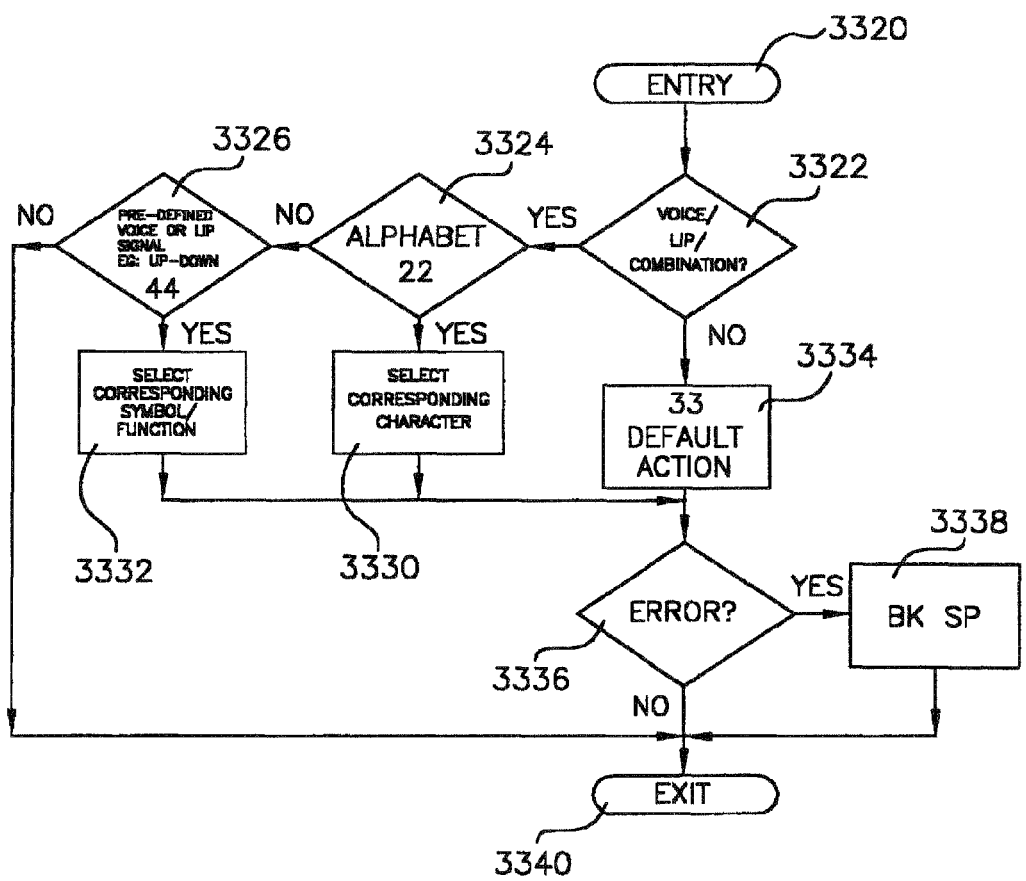
FIG. 24 shows a flowchart concerning the steps of recognition of alpha characters and symbols according to preferred embodiment.
Figure 25:
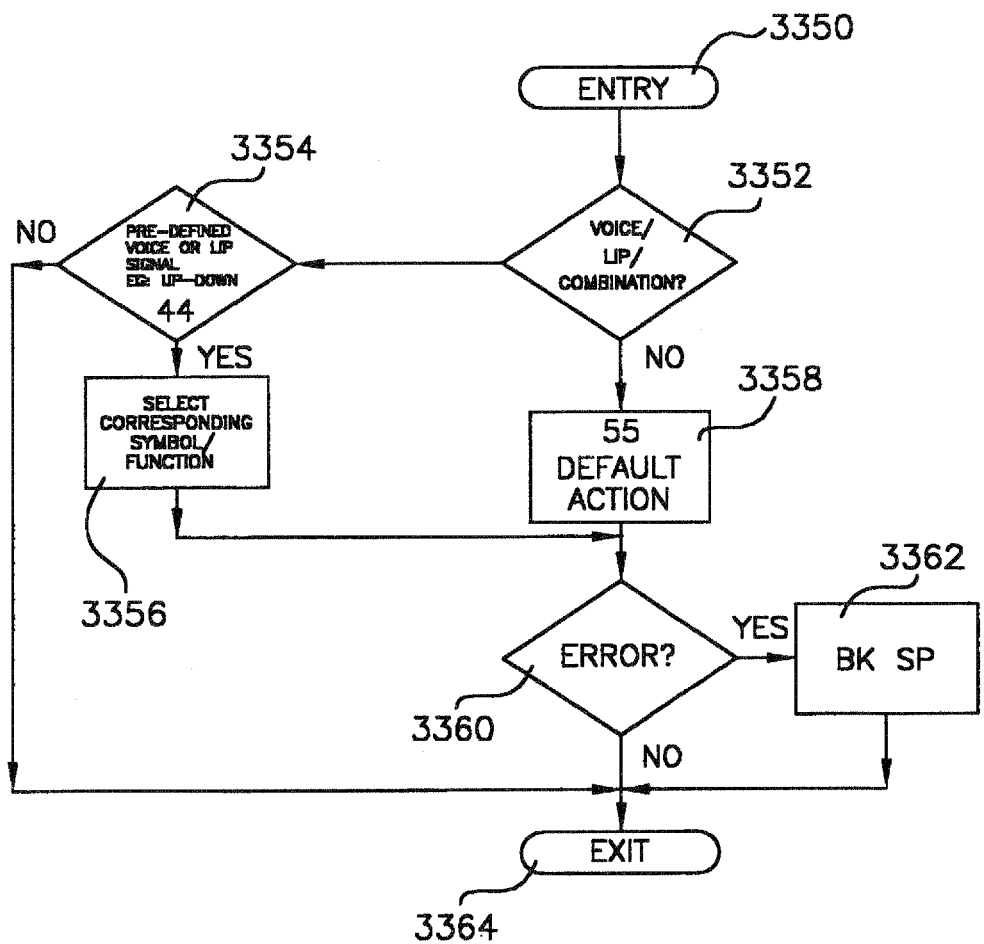
FIG. 25 shows a flowchart concerning the steps of recognition of numeric characters and symbols according to preferred embodiment.
Figure 26:
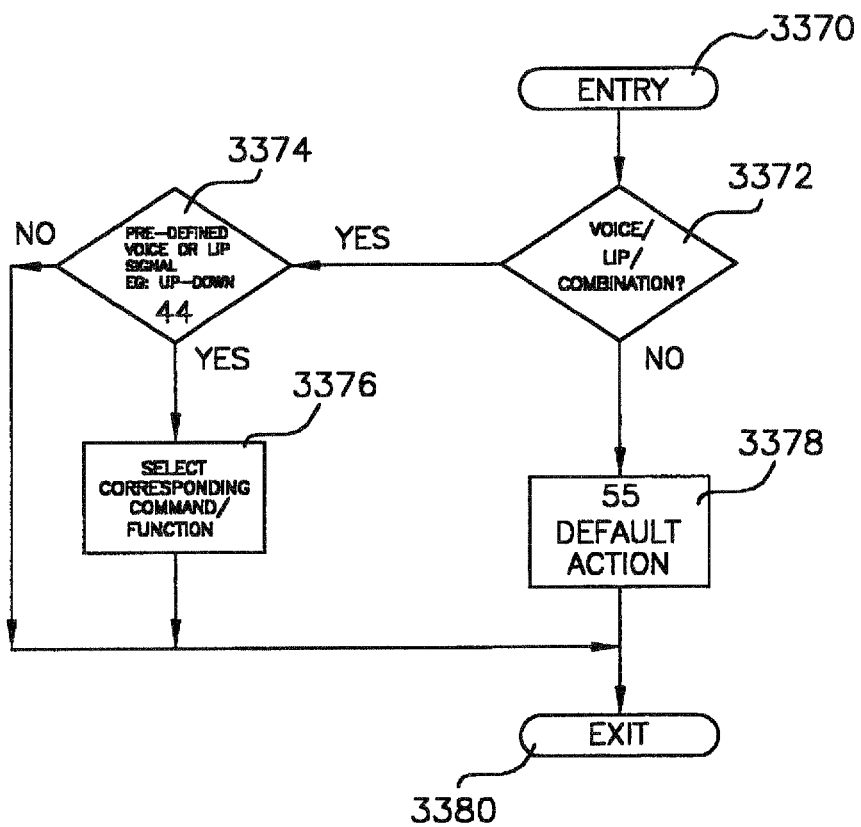
FIG. 26 shows a flowchart concerning the steps of recognition of command and functions according to preferred embodiment.

At step 3304 the system determines which mode of operation has been selected, based on the finger pressed. If Alphabet mode is selected the system goes to step 3306 to begin the alphabet procedure as illustrated in FIG. 24. If the numeric mode is selected the system goes to step 3308 to begin the numeric procedure as illustrated in FIG. 25. Finally if the command mode is selected the system goes to step 3310 to begin the command procedure as illustrated in FIG. 26.

As illustrated in FIG. 24, the alphabet procedure begins at step 3320. At step 3322 the system determines whether the user has pronounced a letter or a word or whether the user has moved his/her lips or other indicating signals, such as facial expression that indicate a function. In the alphabet mode the system for example may receive voice signals of the user pronouncing each letter of alphabet that needs to be typed. For example with reference to FIG. 14, when the system recognizes one of the alphabets pronounced for example "A" the system goes to step 3324 to determine which button is simultaneously pressed. If for example button 1406 is pressed the system at step 3330 selects the corresponding character "A" based on the combination of voice pronouncement of "A" and pressing of button 1406. The combination of voice and finger pressing alleviates the need to press for example button 1405 many times until the desired letter is typed as is currently done.

If the voice or lip indication at step 3322 is not a pronouncement of an alphabet but a predefined command, such as "UP" or "DOWN" the system assigns the character that is located on the upper or lower portion of the button. For example, if the user pronounces "UP" in combination with button 1455 in FIG. 14b, at step 3332 the system selects the corresponding "?" symbol. If however, the system does not recognize a sound or does not hear a corresponding sound it goes to step 3340 and returns to step 3300.

At step 3322, if the system does not hear a sound or recognize the movement of the lip or other facial expression, but a button is pressed by the user, the system goes to step 3334 and selects a corresponding default character symbol or function. For example, with reference to FIG. 14b, if button 1455 is pressed without pronouncing a sound or movement of lips or other facial expression, the system selects the TAB function as the default function. At step 3336 the user by looking at the display window determines if the desired character/s have been selected. If not, the user presses a back space command at step 3338 and the system goes back to step 3300 to begin the operation.

If the numeric mode has been selected by the user, the system goes to step 3350 as illustrated in FIG. 25. Again, at step 3352 the system determines whether the user has pronounced a predefined word such as "UP" or "DOWN" or a not predefined word), or whether the user has moved his/her lips or other facial expression indicating a predefined or not predefined word. If so, the system goes to step 3354 to determine which predefined word as been pronounced in combination with a pressed button.

For example, if button 1454 is pressed in combination with the utterance of the word "UP" the system at step 3356 selects the corresponding "%" sign. If however, the system does not recognize a sound or does not hear a predefined sound it goes to step 3364 and returns to step 3300. If on the other hand, no word is uttered the system goes to step 3358 and the default character is selected. For example numeral "2" in FIG. 14b, in response to pressing of button 1454. In the event of any error of input, the system goes to step 3362 and performs the same functions as discussed with reference with FIG. 24.

Finally, if the user selects a command procedure the system goes to step 3370, and at step 3372 detects whether the user has uttered a word or moved his/her lips or other facial indication indicating a predefined signal, such as uttering the word "UP" or "DOWN," or a not predefined word, as described previously. The system at step 3376 in response to the combination of the uttered predefined word and pressing a button selects a corresponding command or function. If however, the system does not recognize a sound or does not hear a predefined word it goes to step 3380 and returns to step 3300. If no word is uttered or no lip or facial expression movement has been recognized, the system goes to step 3378 and selects a default "command". The system then exits at step 3380 and goes back to step 3300 for the next action by the user.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

What is claimed is:

1. A data entry system comprising:
a first input means for providing a first input signal that ambiguously corresponds to a plurality of characters; and
a second input means for providing a second input signal that unambiguously identifies an individual character;
a dictionary database; and
a word prediction system to provide word prediction from the dictionary database based on a combination of the first input signal and the second input signal, said characters comprising letters, numbers or symbols.

2. The system according to claim 1, wherein a first input signal is provided by a key interaction.

3. The system according to claim 1, wherein a second input signal is identified by at least one of a voice recognition system, a finger recognition system, and a swiping recognition system.

4. The system according to claim 1, wherein said at least one of the first input signals are the input signals corresponding to some characters of a word.

5. The system according to claim 1, wherein said at least one of the first input signals are the input signals corresponding to all characters of a word.

6. The system according to claim 1, wherein a second input signal corresponds to one of any of character positions within a word.

7. The system according to claim 1, wherein the characters are letters of a language.

8. The system according to claim 7, wherein the letters are assigned to four input signals.

9. A method of word predictive data entry using a database of words, the method comprising:
receiving at least one unambiguous, identified letter corresponding to any character position of a word being entered;
receiving at least one ambiguous input signal associated with a plurality of letters of a language; and
determining a word of the database based on said at least one unambiguous identified letter and said at least one ambiguous input signal.

10. The method of claim 9, wherein an identified letter corresponds to one of any of character positions of the word.

11. The method of claim 9, wherein said at least one ambiguous input signal corresponds to one of remaining characters of the word.

12. The method of claim 9, wherein said at least one ambiguous input signal comprises input signals corresponding to all of remaining characters of a desired word.

13. The method of claim 9, wherein the number of input signals to which the letters are assigned is four.

14. The method of claim 9, wherein the input signals are provided by interacting with keys.

15. The method of claim 9, wherein the input signals are provided by interacting with zones on a touch sensitive surface.

16. A method for enhanced word predictive data entry, the method comprising:
receiving at least one unambiguous input signal of a plurality of first input signals corresponding to identified characters;
receiving at least one ambiguous input signal of a plurality of second input signals each corresponding to a plurality of characters;
selecting a word of a database based on said at least one unambiguous input signal that corresponds to an identified character and said at least one ambiguous input signal.

17. The method of claim 16, wherein one of the identified characters corresponds to one of any of the character positions of the word.

18. The method of claim 16, wherein the plurality of second input signals are provided by interacting with corresponding plurality of keys.

19. The method of claim 18, wherein the number of keys is four.

20. The method of claim 19, wherein the keys are zones on a sensitive surface.

21. A method of data entry, comprising:
receiving, by a processor an input signal ambiguously associated with a plurality of characters of a language;
receiving by the processor an identified character of the language corresponding to one of any of character positions of a word being entered;
determining one or more words of a database based on receiving said identified character and said input signal ambiguously associated with the plurality of characters.

22. The method according to claim 21, comprising receiving the ambiguous input signals through key interactions.

23. The method according to claim 21, comprising receiving an identified character, through a speech recognition system after annunciation of the character, through a finger recognition system, or through a swiping action detection.

24. The method according to claim 21, wherein said characters are letters.

* * * * *